(12) United States Patent  
McCarthy et al.

(10) Patent No.: US 6,480,103 B1
(45) Date of Patent: Nov. 12, 2002

(54) COMPARTMENT SENSING SYSTEM

(75) Inventors: Kevin C. McCarthy; Eugenie V. Uhlmann; Brent J. Bos, all of Tucson, AZ (US); Eric J. Hoekstra, Holland; Roger Koops, Hamilton, both of MI (US); Gimtong Teowee, Tucson, AZ (US); Kenneth Schofield, Holland, MI (US); David W. Taylor, Fenton, MI (US); Niall R. Lynam, Holland, MI (US); Robert L. Bingle, Zeeland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/484,754

(22) Filed: Jan. 18, 2000

Related U.S. Application Data

(63) Continuation-in-part of application No. 09/275,565, filed on Mar. 24, 1999, now Pat. No. 6,086,131.

(51) Int. Cl.[7] ................................................. B60Q 1/00
(52) U.S. Cl. ........................ 340/425.5; 340/573.4; 340/573.1; 340/632; 73/23.2; 73/23.3
(58) Field of Search ......................... 340/573.4, 573.1, 340/573, 632, 633, 634, 425.5, 426; 73/23.2, 23.3; 98/1.5

(56) References Cited

U.S. PATENT DOCUMENTS

| | | | |
|---|---|---|---|
| 2,688,865 A | 9/1954 | Foster et al. | 70/129 |
| 3,241,344 A | 3/1966 | Peters | 70/279 |
| 3,553,448 A | 1/1971 | Davis et al. | 240/7.1 |
| 3,582,639 A | 6/1971 | Chamberlain | 240/7.1 |
| 3,678,716 A | 7/1972 | Cobb | 70/92 |
| 3,766,539 A | 10/1973 | Bradshaw et al. | 340/258 |
| 3,829,693 A | 8/1974 | Schwarz | 250/338 |

(List continued on next page.)

FOREIGN PATENT DOCUMENTS

| | | |
|---|---|---|
| DE | 2636099 | 2/1978 |
| DE | 3732936 | 9/1987 |
| DE | 9006007 | 6/1991 |
| EP | 0 235 372 | 11/1986 |
| GB | 2 252 438 A | 8/1992 |
| GB | 2 266 799 A | 11/1993 |
| JP | 50-77938 | 7/1975 |
| JP | 58-188458 | 12/1983 |
| WO | WO98/13235 | 4/1998 |
| WO | WO 99/04119 | 1/1999 |

OTHER PUBLICATIONS

Prosecution File for Reissue Application 09/344,384, filed Jun. 24, 1999, for Reissue of U.S. Patent 5,859,479 already of record.

"Kit 62 Movement Detector Components", Sep. 24, 1994 pp. 1–5.

Securaplane Technologies Product Information.

*Primary Examiner*—Daryl Pope
(74) *Attorney, Agent, or Firm*—Fitzpatrick, Cella, Harper & Scinto

(57) ABSTRACT

A system for sensing ambient conditions in a compartment, such as the trunk of an automobile, generates a control signal in response to the sensed conditions. This control signal actuates indicators to notify operators of the vehicle that there is a person trapped in the trunk. The control signal is also used to actuate a lamp inside the trunk to provide light for the trapped person. A trunk release is also actuated, by a control module, to free the trapped person. The trunk release of the automobile can be prevented from being actuated if the automobile is moving, which prevents the trunk lid from unexpectedly opening while the vehicle is in motion.

39 Claims, 18 Drawing Sheets

U.S. PATENT DOCUMENTS

| | | | |
|---|---|---|---|
| 3,839,640 A | 10/1974 | Rossin | 250/353 |
| 3,956,732 A | 5/1976 | Teich | 340/64 |
| 3,992,909 A | 11/1976 | McGhee | 70/379 |
| 4,007,955 A | 2/1977 | Kobayashi | 292/216 |
| 4,052,716 A | 10/1977 | Mortensen | 340/233 |
| 4,080,812 A | 3/1978 | Knott | 70/256 |
| 4,155,233 A | 5/1979 | Lira | 70/92 |
| 4,166,955 A | 9/1979 | Keller | 250/342 |
| 4,242,669 A | 12/1980 | Crick | 340/567 |
| 4,312,197 A | 1/1982 | Carrion et al. | 70/135 |
| 4,318,089 A | 3/1982 | Frankel et al. | 340/567 |
| 4,322,959 A | 4/1982 | Mochida | 70/241 |
| 4,342,210 A | 8/1982 | Denningham | 70/278 |
| 4,379,971 A | 4/1983 | Smith et al. | 250/342 |
| 4,384,207 A | 5/1983 | Doctor | 250/349 |
| 4,418,335 A | 11/1983 | Genähr | 340/565 |
| 4,437,003 A | 3/1984 | Doctor | 250/338 |
| 4,441,023 A | 4/1984 | Doctor et al. | 250/338 |
| 4,464,649 A | 8/1984 | Her | 340/72 |
| 4,468,657 A | 8/1984 | Rossin | 340/555 |
| 4,507,654 A | 3/1985 | Stolarczyk et al. | 340/545 |
| 4,556,796 A | 12/1985 | Renals | 250/338 |
| 4,604,524 A | 8/1986 | Kotlicki et al. | 250/342 |
| 4,612,442 A | 9/1986 | Toshimichi | 250/353 |
| 4,645,233 A | 2/1987 | Bruse et al. | 280/808 |
| 4,667,990 A | 5/1987 | Quantz | 292/201 |
| 4,697,081 A | 9/1987 | Baker | 250/338 |
| 4,704,533 A | 11/1987 | Rose et al. | 250/342 |
| 4,709,153 A | 11/1987 | Schofield | 250/353 |
| 4,745,284 A | 5/1988 | Masuda et al. | 250/338 |
| 4,746,910 A | 5/1988 | Pfister et al. | 340/567 |
| 4,752,768 A | 6/1988 | Steers et al. | 340/567 |
| 4,764,755 A | 8/1988 | Pedtke et al. | 340/541 |
| 4,775,347 A | 10/1988 | Takada et al. | 445/44 |
| 4,797,657 A | 1/1989 | Vorzimmer et al. | 340/541 |
| 4,825,079 A | 4/1989 | Takamatsu et al. | 250/338.3 |
| 4,848,114 A | 7/1989 | Rippe | 70/263 |
| 4,848,509 A | 7/1989 | Bruhnke et al. | 180/287 |
| 4,857,912 A | 8/1989 | Everett, Jr. et al. | 340/825.3 |
| 4,868,390 A | 9/1989 | Keller et al. | 250/338.3 |
| 4,881,148 A | 11/1989 | Lambropoulos et al. | 361/172 |
| 4,895,009 A | 1/1990 | Kleefeldt et al. | 70/264 |
| 4,930,864 A | 6/1990 | Kuster et al. | 350/167 |
| 4,933,668 A | 6/1990 | Oyer et al. | 340/541 |
| 4,952,808 A | 8/1990 | Turnbull et al. | 250/338.3 |
| 4,954,813 A | 9/1990 | August, Sr. et al. | 340/571 |
| 4,979,384 A | 12/1990 | Malesko et al. | 70/241 |
| 4,982,094 A | 1/1991 | Matsuda | 250/342 |
| 5,027,104 A | 6/1991 | Reid | 340/541 |
| 5,030,012 A | 7/1991 | Hagins et al. | 374/31 |
| 5,045,702 A | 9/1991 | Mulleer | 250/342 |
| 5,054,826 A | 10/1991 | Dow et al. | 292/125 |
| 5,063,371 A | 11/1991 | Oyer et al. | 340/541 |
| 5,071,160 A | 12/1991 | White et al. | 280/735 |
| 5,077,549 A | 12/1991 | Hershkovitz et al. | 340/567 |
| 5,084,696 A | 1/1992 | Guscott et al. | 340/541 |
| 5,093,656 A | 3/1992 | Dipoala | 340/522 |
| 5,216,407 A | 6/1993 | Hwang | 340/426 |
| 5,219,413 A | 6/1993 | Lineberger | 180/272 |
| 5,283,551 A | 2/1994 | Guscott | 340/567 |
| 5,317,620 A | 5/1994 | Smith | 379/40 |
| 5,424,711 A | 6/1995 | Müller et al. | 340/426 |
| 5,424,712 A | 6/1995 | Rosenberger | 340/426 |
| 5,424,718 A | 6/1995 | Müller et al. | 340/567 |
| 5,445,326 A | 8/1995 | Ferro et al. | 292/336 |
| 5,482,314 A | 1/1996 | Corrado et al. | 280/735 |
| 5,486,810 A | 1/1996 | Schwarz | 340/521 |
| 5,585,625 A | 12/1996 | Spies | 250/221 |
| 5,636,536 A | 6/1997 | Kinnucan | 70/107 |
| 5,663,704 A | 9/1997 | Allen et al. | 340/426 |
| 5,693,943 A | 12/1997 | Tchernihovski et al. | 250/342 |
| 5,711,559 A | 1/1998 | Davis | 292/340 |
| 5,719,551 A | 2/1998 | Flick | 340/426 |
| 5,726,629 A | 3/1998 | Yu | 340/565 |
| 5,737,083 A | 4/1998 | Owechko et al. | 356/375 |
| 5,793,291 A * | 8/1998 | Thornton | 340/573 |
| 5,805,056 A | 9/1998 | Mueller et al. | 340/426 |
| 5,848,802 A | 12/1998 | Breed et al. | 280/735 |
| 5,859,479 A | 1/1999 | David | 307/10.8 |
| 5,887,466 A | 3/1999 | Yoshizawa | 70/257 |
| 5,910,854 A | 6/1999 | Varaprasad et al. | 359/273 |
| 5,933,090 A | 8/1999 | Christenson | 340/825.69 |
| 6,024,388 A | 2/2000 | Tomah et al. | 292/216 |
| 6,086,131 A | 7/2000 | Bingle et al. | 296/76 |
| 6,130,614 A * | 10/2000 | Miller et al. | 340/573.4 |
| 6,166,625 A | 12/2000 | Teowee et al. | 340/426 |
| 6,222,442 B1 * | 4/2001 | Gager et al. | 340/426 |

\* cited by examiner

COMPARTMENT SENSING SYSTEM

This application is a continuation-in-part of U.S. application Ser. No. 09/275,565, filed Mar. 24, 1999, now U.S. Pat. No. 6,086,131.

BACKGROUND OF THE INVENTION

1. Field of the Invention

This invention relates to a sensing system to sense conditions in a compartment and to generate a response. More particularly, this invention pertains to a system that senses conditions within a vehicle compartment, such as the presence of a human or other animal, and also senses other vehicle conditions. The system responds to the sensed conditions in a predetermined manner. The response includes, for example, actuating an indicator and/or controlling a latching mechanism.

2. Background Art

Vehicle sensing systems typically utilize sensors to detect occupants in the passenger compartment of a vehicle. These systems utilize the sensed information for airbag deployment and/or intrusion alert. Conventional sensing-alert systems do not address the problem of preventing humans and/or pets from being trapped in a vehicle such as, for example, a vehicle cargo compartment (trunk). Automobiles are particularly dangerous as there are multiple means of entry into the trunk for example, fold-down rear seats, remote keyless entry modules, and push-buttons or pull levers under the dashboard or beside the seat or otherwise located in the vehicle compartment that when actuated release the trunk. Typically there is no means of exit from the trunk once inside. In particular, automobile trunks present a potential safety hazard to humans and pets because the latching mechanism may close while they are in the trunk. This is particularly true for young children who may accidently become trapped in the trunk of a car and suffer serious physical injury and/or emotional distress because they are unable to escape and there is no means for notifying someone that they are trapped. There is a need for a system that can sense when a person is in the vehicle passenger compartment or trunk compartment and generate a response to facilitate their release.

SUMMARY OF THE INVENTION

This invention relates to a system for detecting humans and animals that may be trapped in a compartment, such as the trunk of a vehicle. Accordingly, one embodiment is directed to an apparatus for controlling the status of a compartment of a vehicle. This apparatus includes a first sensor, which is disposed in the compartment and generates an alert signal responsive to sensed conditions in the compartment. A controller is coupled to the sensor and receives the alert signal. In response to the received alert signal, the controller generates a control signal in accordance with the received alert signal. A mechanism is coupled to the controller and disposed in the compartment. The mechanism receives the control signal from the controller and enters an open position when actuated by the control signal.

Another embodiment is directed to an apparatus for controlling a light source in a compartment. This apparatus includes a latching mechanism that is mounted on the compartment. The latching mechanism generates a mechanism signal indicative of latching mechanism position. A sensor, typically a pyroelectric sensor, is mounted on a surface of the compartment and senses thermal changes by sensing changes in radiant flux. When the sensor senses a change in the flux and a change in heat, the sensor generates an alert signal. The light source is mounted on a surface of the compartment for emitting light energy when actuated. A controller is coupled to the latching mechanism, the sensor and the light source, for receiving the alert signal from the sensor and the mechanism signal from the latching mechanism. The controller generates a control signal as a function of the alert signal and the mechanism signal. The control signal actuates the light source when the alert signal is received and the mechanism signal indicates the compartment is closed.

Yet another embodiment is directed to a method for controlling the status of a compartment latch of a vehicle. This method includes the steps of sensing conditions in the compartment at predetermined time intervals. An alert signal indicative of the sensed conditions is generated. Then a motion signal indicative of vehicle motion is generated. The alert signal and the motion signal are transmitted to a controller and a control signal is generated in accordance with the alert signal and the motion signal. The compartment latch is actuated in response to the control signal.

Yet another embodiment is directed to a vehicle cargo compartment control system for controlling an actuatable latch disposed on a cargo compartment of a vehicle. The vehicle is capable of generating a motion signal indicative of a state of vehicle motion. A sensor is disposed in the cargo compartment, and senses the presence of a being in the cargo compartment. The sensor generates a sensor signal when a being is sensed. A controller, which is coupled to the sensor and the actuatable latch of the cargo compartment, receives the sensor signal and the motion signal. The controller determines whether the sensor signal exceeds a predetermined threshold. The controller actuates the latch of the cargo compartment when the sensor signal exceeds the predetermined threshold and the motion signal indicates the vehicle is in a stationary state.

Yet another embodiment is directed to a latch release system for actuating a trunk latch of a vehicle. The vehicle is capable of generating a vehicle motion signal indicative of vehicle motion. The vehicle has a passenger compartment and a trunk compartment. The latch release system comprises a sensor, mounted in the interior of the trunk compartment, that senses thermal energy in the trunk compartment and generates an output signal indicating a sensed quantity of thermal energy in the trunk compartment. An indicator, mounted in the passenger compartment of the vehicle, is capable of illumination. A controller, mounted on the vehicle and coupled to the sensor and the indicator, receives the output signal from the sensor and compares the magnitude and quantity of the output signals received from the sensor to a predetermined magnitude and a predetermined time period to establish an alarm condition. The controller also receives the vehicle motion signal from the vehicle indicative of vehicle motion. The controller actuates the trunk latch when an alarm condition has been established and the vehicle motion signal indicates the vehicle is in a stationary state. The controller illuminates the indicator when an alarm condition has been established and the vehicle motion signal indicates the vehicle is in a non-stationary state.

Yet another embodiment is directed to a latch release system for selectively conditioning the opening of a normally closed trunk compartment lid of a movable vehicle. The vehicle is capable of generating a vehicle motion signal indicative of vehicle motion and has an indicator mounted on a passenger compartment of the vehicle. The trunk compartment lid has latched and unlatched states and is latched into its latched state by a selectively releasable latching mechanism disposed on the trunk compartment lid. The system comprises a sensing circuit mounted on the vehicle for sensing the presence of an occupant within the trunk compartment. The sensing circuit produces an output signal in response to sensing an occupant. A control circuit is coupled to the sensing circuit, the indicator, and the latching mechanism. The control circuit receives the output signal from the sensing circuit and receives the vehicle motion signal, and responsive to the output signal illuminates the indicator when the vehicle motion signal indicates the vehicle is moving. The control circuit conditions the latching mechanism to unlock the trunk compartment when the vehicle motion signal indicates that the vehicle is stationary.

Yet another embodiment is directed to a sensor system for sensing an occupant in a vehicle compartment comprising a primary sensor, mounted in the compartment, for sensing the presence of a living being such as a human in the compartment. The primary sensor is adapted to generate an output signal upon receiving adequate input. A controller is coupled to the primary sensor, for receiving the output signal from the primary sensor and generating a control signal based on the output signal. The control signal is transmitted to one or more destinations.

Yet another embodiment is directed to a system for sensing an occupant in a vehicle compartment comprising a primary sensor. The primary sensor is mounted in the compartment and senses the presence of a living being such as a human in the compartment. The primary sensor is adapted to generate a primary output signal upon receiving adequate input. One or more secondary sensors are coupled to the primary sensor and activate upon receiving the primary output signal from the primary sensor. The secondary sensors generate a secondary output signal. A controller, coupled to the secondary sensor, receives the secondary output signal from the secondary sensor and generates a control signal based on the secondary output signal. The control signal is transmitted to one or more destinations. These destinations are, for example, an indicator light, a trunk latch mechanism, horn, headlights, interior lights, a pager and a remote keyless entry module.

Further advantages and features of the invention will become apparent to those skilled in the art upon an examination of the following detailed description of preferred embodiments taken in conjunction with the accompanying drawings.

DETAILED DESCRIPTION OF THE PREFERRED EMBODIMENTS

The present invention pertains to a sensing system for compartment applications, particularly for providing an indication of a person or animal trapped in the trunk or passenger compartment of a vehicle, such as an automobile.

Figure 1:
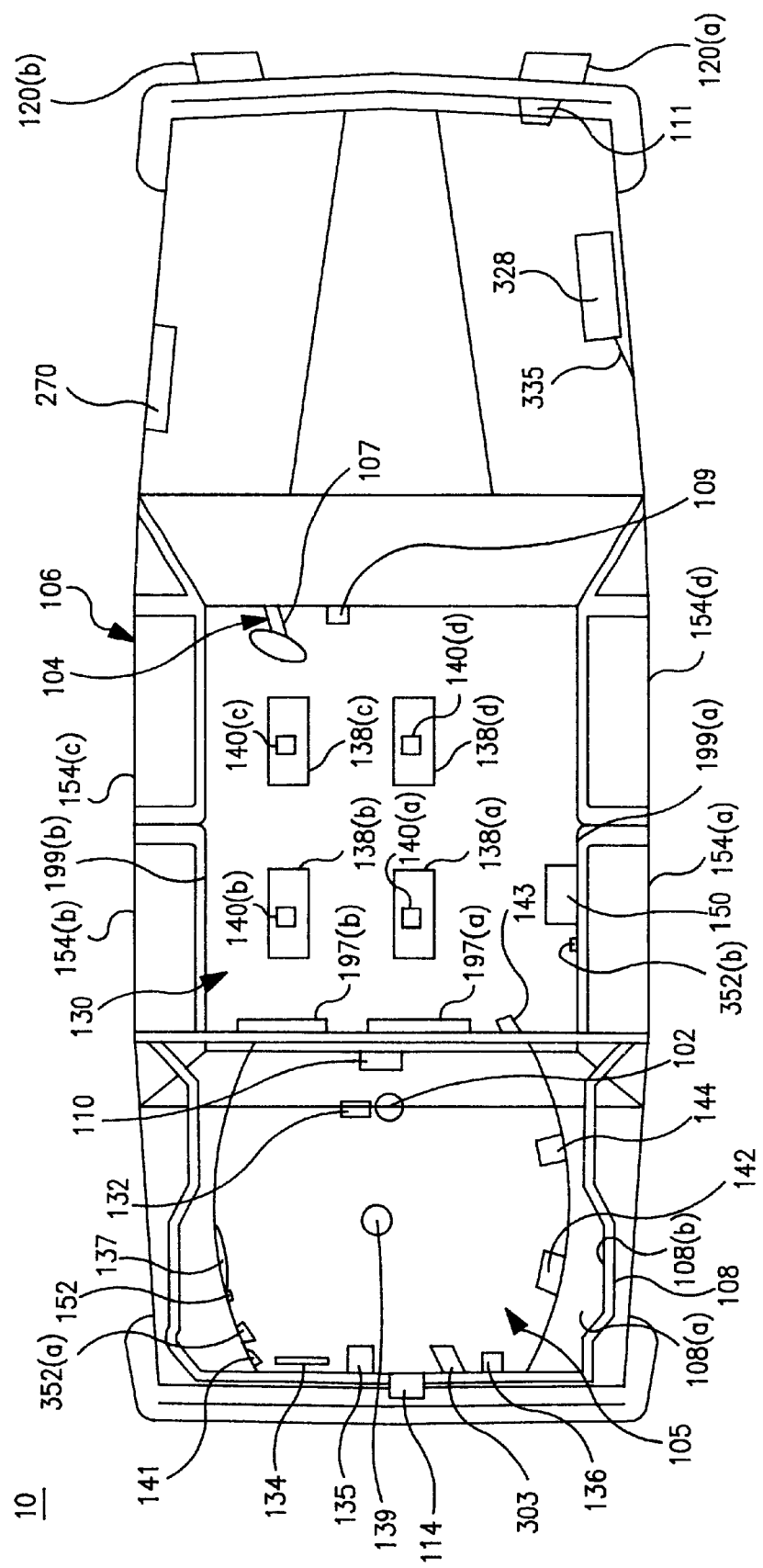
FIG. 1 shows a vehicle having a compartment sensing system.

FIG. 1 shows the system 10 in the environment of a vehicle 106. The vehicle 106 is a conventional automobile with door locks 154(a) . . . (d) and any other options available on the vehicle 106.

A sensor 102, such a pyroelectric infrared (PIR) sensor (also referred to as a detector herein), is disposed in a compartment 105, which is shown as a trunk or baggage compartment or cargo compartment or other storage compartment provided in the vehicle. Alternatively, the sensor 102 could be mounted in the passenger compartment 130.

The interior cabin of a vehicle 106 parked in a sunny climate can reach air temperatures in excess of 150° Fahrenheit and humans and pets can be rapidly overcome by the heat. For such applications, the sensor 102 is suitably mounted in locations such as the rear-view mirror, in the dome light or in the headliner of the vehicle. An occupant sensing system with a sensor mounted on a rear-view mirror is described in commonly assigned U.S. patent application Ser. No. 08/901,929 filed Jul. 27, 1997, which is hereby incorporated by reference in its entirety herein.

PIR sensors are inexpensive and reliable sensors that require very low power to detect sudden changes in the thermal profile of a compartment 105, 130 due to movement of a living being. The PIR sensor is particularly desirable because of the high reliability and sensitivity of the device. A preferred PIR sensor has sufficient sensitivity to detect the thermal changes inside a compartment 105, 130. A desirable sensing device should have detection capability preferably greater than $10^5$ cm Hz/W (and most preferably greater than $10^6$ cm Hz/W), low noise and high signal to noise ratio. Furthermore, the sensor should be able to resolve a body at a temperature of about 37° C. moving at a frequency of approximately 5 Hz and at a distance of about 1–7 meters. Preferably, the sensor should also be able to resolve a body about 37° C. at a velocity of 0.1–3 m/s and at a distance of about 0.25–5 meters.

One or more PIR sensors may be utilized to acquire sufficient sensing input. The PIR sensor 102 typically comprises single or multiple elements enclosed in the same package. The package may be a standard TO-5 transistor package, which is a popular metal can package such as the P7178 series available from Hamamatsu™ or the LHi 954 available from Heimann™. A PIR packaged in plastic such as epoxy, polysilane or silicone may also be used. The package may include thin film elements, a thick film load resistor, and a Junction-Field-Effect Transistor (JFET) preamplifier. Preferably, all components are hermetically sealed in the package. The sensor may also incorporate RF immunity into the TO-5 package such as a 220 microfarad capacitor in parallel with the pyroelectric elements or metallic grid or coating to reduce stray RF to the elements. Thus, the sensor can incorporate electronic compounds to improve rejection of RF noise to achieve signal amplification and/or noise reduction.

Other types of sensors that are also suitable include thermopile detectors, image sensors, radar, ultrasonic, carbon dioxide sensors, bolometers and a thermal imaging camera.

Floor mats 138 (*a*)–(*d*) include sensing elements 140(*a*)–(*d*) that are capacitive, resistive and/or pressure sensitive. The mats 138 are placed on the floor of the trunk compartment 105 or passenger compartment 130 and are used to produce a signal indicative of the presence of a human or animal in the trunk or passenger compartment. In this embodiment, when a human or pet applies pressure to the mat 138, a signal is produced by the associated sensor 140. The signal is indicative of a sensed pressure exerted by the weight of a human or animal. The signal is used by a controller 110 to produce a visible indication or release a latch. Also, shock sensors 142, microphones 144, level sensors 136, cameras 137, and/or bolometers 141 are suitably used to sense movement in the trunk compartment 105.

Level sensor 136 is coupled to controller 110 to sense whether the vehicle is being elevated at either end, such as when the vehicle is being towed.

Cameras 137 is used to scan the compartment and generate images. Such cameras are known to those skilled in the art.

Bolometers 141 are coupled to controller 110 and are broad band detectors that are sensitive to electromagnetic radiation. Although the bolometer is essentially a Wheatstone bridge, with two platinum strips, when one strip receives radiation, its electrical resistance changes slightly compared to the other strip. The measured difference indicates the amount of radiation received. More advanced bolometers use materials more sensitive to temperature, such as semiconductors, indium, antimonide and germanium mixed with gallium or indium. Microfabrication techniques enable the production of arrays of bolometers. Bolometer 141 is either a single bolometer or an array of bolometers available from Honeywell™.

Shock sensor 142 is coupled to controller 110 and is used for detecting impact on portions of the vehicle, for example an occupant striking a compartment wall or glass window while attempting to escape. Shock sensor 142 is, for example an SH15 sensor available from FBII™.

Microphone 144 is coupled to controller 110 and is used to detect sound in the compartment, such as a trapped occupant calling for help.

It is an embodiment of the invention that any combination of the above-listed sensing mechanisms could be used in conjunction with other of the sensing means to sense a human or animal in a passenger compartment 130 or cargo compartment 105 of a vehicle 106. For example, a pyro sensor 102 is suitably combined with a shock sensor 142 such that thermal energy and motion detection are required to generate a signal indicating the presence of a person or animal. The combination of a plurality of sensors reduces the likelihood of a false alarm.

It is also an embodiment that selected ones of the above-listed sensing mechanisms are operated such that power consumption by the system is minimized. For example, sensing mechanisms that require less power to operate are used as primary sensing mechanisms, which are used to trigger secondary sensing mechanisms. Once the secondary sensing mechanisms are triggered, they can confirm that a viable signal is present. Typically, the primary sensing mechanisms are used to constantly monitor the status of the compartment and upon sensing a possible occupant in the compartment transmit a signal to the secondary sensing mechanisms.

It is also an embodiment of the invention that the sensing system 10 generates a step-wise response by activating particular selected mechanisms, waiting a particular period of time and activating additional mechanisms. For example, the thermal sensor 102, upon sensing an occupant triggers controller 110 to illuminate a light 139. When additional activity in the vehicle 106 is sensed within a pre-determined period of time, the controller 110 will activate a tell/tale indicator 109. If additional input is received, the controller 110 actuates the trunk release mechanism 114.

The step-wise response permits one level of response when a primary sensor is triggered and a second level of response when a secondary sensor is triggered.

Typically, a human body emits radiation in the 8–14 micron wavelength range with a peak emission typically around 9.3 microns. This radiation, emitted as IR radiation, is absorbed by the thermal sensor, preferably converted to heat, and later to an electric signal. Therefore, a filter material should be installed between the sensor and the view to block radiation in other wavelength ranges to avoid false alarms. The system 10 should require less than about one Watt of power, and preferably less than about 0.1 Watts, and most preferably less than about 0.02 Watts, when employed in a vehicle in the parked state. Since the system 10 receives power from the car battery 328, via line 335, the system 10 will not function when the battery 328 not sufficient. Therefore, it is an embodiment of the instant invention to provide an auxiliary power supply 270 that supplies power solely for the PTRS system, and, optionally to the trunk release mechanism.

Conventional vehicles use a 12 volt battery as a power supply. The sensing system 10 is continually activated when the vehicle ignition is not operating. The sensing system 10 typically draws less than about 15 mA, preferably less than about 8 mA, more preferably less than about 1 mA and most preferably, less than about 0.5 mA. In vehicles with a 42 volt battery power supply or a 48 volt power supply, the sensing system 10 current draw is less than about 3.75 mA, preferably less than about 1.25 mA, more preferably less than about 0.25 mA and most preferably less than about 0.125 mA.

The exemplary vehicle 106 illustrated in FIG. 1 has a trunk deck 108 with inner and outer surfaces 108A and 108B, respectively. For trunk applications, the thermal sensor 102 is suitably mounted in a number of different locations including the deck lid 108, underneath a parcel shelf in the trunk 105 (parcel shelf not shown), the front of the trunk (i.e., on the inside behind the license plate), and on the back of the trunk, for example, on the inside portion of the back seats 197A and 197B. The security of the mounting is very important since movement of the thermal sensor 102 against the vehicle body could cause a false signal. Mounting techniques include mechanical attachments and/or adhesive attachments and typically include, for example, adhesives, Velcro™, pins, bolts and screws. The mounting of the thermal sensor 102 can either be distinct or integral. If the mounting is distinct, it can be for example, a separate mounting bracket or back plate. If integral, the mounting is molded into the housing of the sensor 102. Typically the thermal sensor 102 is mounted on the trunk lid 108 or alternatively attached at the parcel shelf at the trunk to prevent possible damage when luggage or other objects are placed in the trunk.

A latch mechanism 114 is mounted on the vehicle 106 to enable the trunk deck 108 to maintain a closed position in relation to the vehicle 106. The latch mechanism 114 can be actuated when the thermal sensor 102 generates an alert signal and a controller 110 causes the latch mechanism 114 to enter an "open" position and thus open the trunk deck 108. The latch mechanism 114 is capable of generating a trunk lid status signal indicative of whether the trunk lid is "OPEN" or "CLOSED". This trunk lid status signal is transmitted to the controller 110.

Alternatively, a latch module (not shown in FIG. 1) is suitably located remotely from the latch mechanism 114 and generates a trunk lid status signal indicative of the position of the trunk lid 108.

A tell/tale light 109 is mounted on the dashboard of the vehicle 106 and coupled to controller 110. The tell/tale light 109 is suitably actuated when the sensor 102 detects a change in the temperature of the compartment 105 such that the sensor 102 generates an alert signal and the controller 110 activates the tell/tale light 109. The location of the tell/tale light 109 is a design choice and lacks criticality. Indeed, the system 10 could function without the tell/tale light 109, and utilize other indicators, such as interior lights 150, horn 111, headlights 120(a) and (b) or any combination thereof. One example of using the horn 111 to indicate a sensed condition is sounding the horn 111 to produce the SOS signal, which will be reserved exclusively to signify a human being trapped in the vehicle 106. Also, the headlamps 120(a) and (b) could flash an SOS signal to indicate a human is trapped in the vehicle 106. Also, activating a conventional anti-theft vehicle alarm system (not shown), turning on the interior lights 150 of a vehicle, and/or activating a telemetric, wireless vehicle remote command system such as an ONSTAR™ or RESCU™ (not shown) system are other examples of indicating that a sensed condition is present in the vehicle 106.

In addition to the SOS signal another pattern of output by the horn, headlamps, interior lights and the like could be used. This output signal could be reserved specifically for a trapped occupant such that people hearing the output or seeing the signals would understand the significance of the output.

Ignition module 107 is typically located on the steering column and is coupled to controller 110. In one embodiment, when the ignition 107 is "ON", indicating that the engine is running, the controller 110 will not activate the latch mechanism 114. Thus, the trunk lid 108 will not open if the engine is running.

Temperature sensor modules 352(a) and 352(b) are also mounted in the compartments 105, 130, respectively, to sense ambient temperature. The temperature sensing modules 352(a) and 352(b) are coupled to the controller 110. When the ambient temperature exceeds a predetermined quantity, the controller 110 will generate a control signal more quickly. This has the advantage that if a child is trapped in a trunk 105 on a hot day, the latch mechanism 114 trunk release will be actuated in less time. This will reduce the likelihood that a trapped child will suffer injuries related to excessive heat. The thermal sensor 102 is also suitably coupled to temperature sensors 352(A) and 352(B) and is adapted to provide different signal strengths with changes in the ambient temperature. The temperature can be monitored by temperature modules 352 and used to influence the gain of the output so that a reliable signal is received at all times. This reduces the likelihood of a false alarm condition since the baseline of the thermal sensor 102, which might drift upward as the ambient temperature increases, is corrected. The signal received from the temperature sensing modules 352 is used to determine whether an alert signal is generated. For example, in a situation in which the ambient temperature of the vehicle passenger compartment 130 is between 55 and 70 degrees Fahrenheit, the system 10 may not generate an indication at all, since it is acceptable for passengers to be in the passenger compartment 130 at such temperatures.

One potential for false detection is towing the vehicle 106 (ignition of car in "PARK") with hot or cold groceries or other items that influence the temperature of the cargo compartment 105 on passenger compartment 130. The movement of the vehicle 106 may cause these items to shift, thus generating a positive detection signal. One method to prevent this is to utilize a level sensor 136, which is coupled to the controller 110, so that when the level sensor 136 detects a towing condition, the controller 110 is disabled.

It is possible that an output signal may be generated falsely by movement of the body of the vehicle 106 (i.e. rocking a vehicle 106 that has a bag of ice in the trunk 105). In order to overcome this possible concern, the thermal sensor 102 is suitably combined with motion detector 132. The combination of the motion sensor 132 and the thermal sensor 102 means that unless both sensors are triggered, an alarm condition will not be generated.

Use of the level sensor 136 to detect vertical and horizontal movement will reduce the likelihood of a false alarm generated by wind gusts, since wind gusts typically produce primarily horizontal movement components and very slight vertical movement components. Also filtering the received signals reduces the likelihood of a false alarm situation since humans moving in a vehicle compartment 105, 130 will typically generate signals with a frequency between about 0.05 Hz to 10 Hz more preferably about 0.075 Hz to 5 Hz and most preferably about 0.1 Hz–2.0 Hz. Thus filtering signals with a frequency below three Hertz is typically acceptable.

Inanimate objects in motion are greatly dependent on the resonant frequency of the vehicle. For example the General Motors™ 2000 Impala™ has a resonant frequency at about 2.25 Hz. Almost all heated or cooled inanimate objects will oscillate at this frequency for that particular car. All automobile natural frequencies will differ according to the size of the vehicle.

Optionally, movement of inanimate objects put into motion by resonant motion of a vehicle can be distinguished from human or animal motion. This is achieved on the basis of frequency motion resulting from car motion that can only occur at a frequency at or above that frequency of the car.

Another potential for false detection is when the vehicle 106 is in a car wash and hot and/or cold groceries are also in the vehicle cargo compartment 105 or passenger compartment 130. In order to prevent an alarm condition, a motion sensor 132 to sense motion within the vehicle compartments 105, 130 is suitably used in conjunction with the thermal detector 102.

In situations in which the vehicle is rocked or in a carwash, it is preferable to have the trunk lid 108 remain closed.

Various indication alternatives may be used, including the flashing of interior lights 150, siren and a cellular phone call to 911 or another user-specified number to alert the user or other personnel of an alarm condition. Depending on the type of vehicle 106 the system output may vary. For some vehicles, the trunk lid can be released through the Body Control Module (BCM) 151. The BCM release of the truck lid 108 will require the PTRS system 10 to ground an output to the BCM 151. For other vehicles, the trunk lid 108 must be released directly. The system 10 would then supply a pulse to the rear compartment lid motor 303. Other indications such as sounding the horn 111, flashing the lights 120(*a*) and 120(*b*), and/or sounding an alarm are suitably used. Also, activating or "beeping" a remote keyless entry module, or activating a LO-Jack™ system are other means of indicating that a human or animal has been sensed in the vehicle 106.

Another feature of this invention is seat position sensors 199(*a*) and 199(*b*) that provide an indication of seat position. Thus, rear seats 197(*a*) and (*b*) referred to collectively as 197, of vehicle 106 seal off the trunk compartment 105 when they are in an upright position. Seat position sensors 199 sense the position of seats 197 and when the seats are not in an upright position, the trunk latch 114 will not be actuated. This enables passengers to occupy the trunk compartment 105 without activating the system when the rear seats 197 are down. This is particularly useful in compact cars in which the rear seats 197 are put down for additional storage. The status of the rear seat position is suitably used to determine whether to generate an alarm condition. For example, if the rear seats 197 have been folded down and the trunk lid 108 has not been opened prior to a sensed signal, the controller 110 determines that any received signal is a false alarm and will not generate an alarm condition.

The rear seats 197 are also coupled to the controller 110 such that if the seat position sensors 199(*a*) and 199(*b*) indicate that the rear seats 197 are in the upright position and an alarm condition is generated, the rear seats 197 will be released. This will provide a means of escaping from the trunk compartment 105 into the passenger compartment 130 of the vehicle 106. This permits exit from the trunk compartment 105 without compromising the security of the vehicle 106.

Speakers 137 are mounted in the trunk compartment 105 of the vehicle 106 so that a recorded message is played when an alarm condition is generated. This message may be recorded by an owner of the vehicle who may have a child who is likely to be trapped in the trunk of the vehicle 106. Thus, a child trapped in the trunk 105 of the family car will hear a recorded message by their parent. This message could instruct the child regarding release, i.e. pulling on a manual release handle 134 or to stay calm.

Alternatively, a solid state chip 152 is suitably used to output a pre-recorded message when an alarm condition is generated. The content of this pre-recorded message is typically instructions regarding exiting the vehicle 106.

An illumination source, such as a light, 139 is coupled to controller 110 and is mounted in the trunk compartment 105 to illuminate the compartment 105. Typically the light 139 is positioned to illuminate manual release handle 134. The light 139 is typically an array of LEDs that are capable of emitting blue light, yellow light, white light, green light, orange light, red light or any combination thereof.

Also, a second illumination source, such as a light, 135 is suitably disposed within handle 134 to illuminate the handle 134 from within. This enables a handle to be illuminated when a person is sensed in the trunk. This is used in conjunction with a pre-recorded message instructing the trapped person to pull the illuminated handle.

Figure 2:
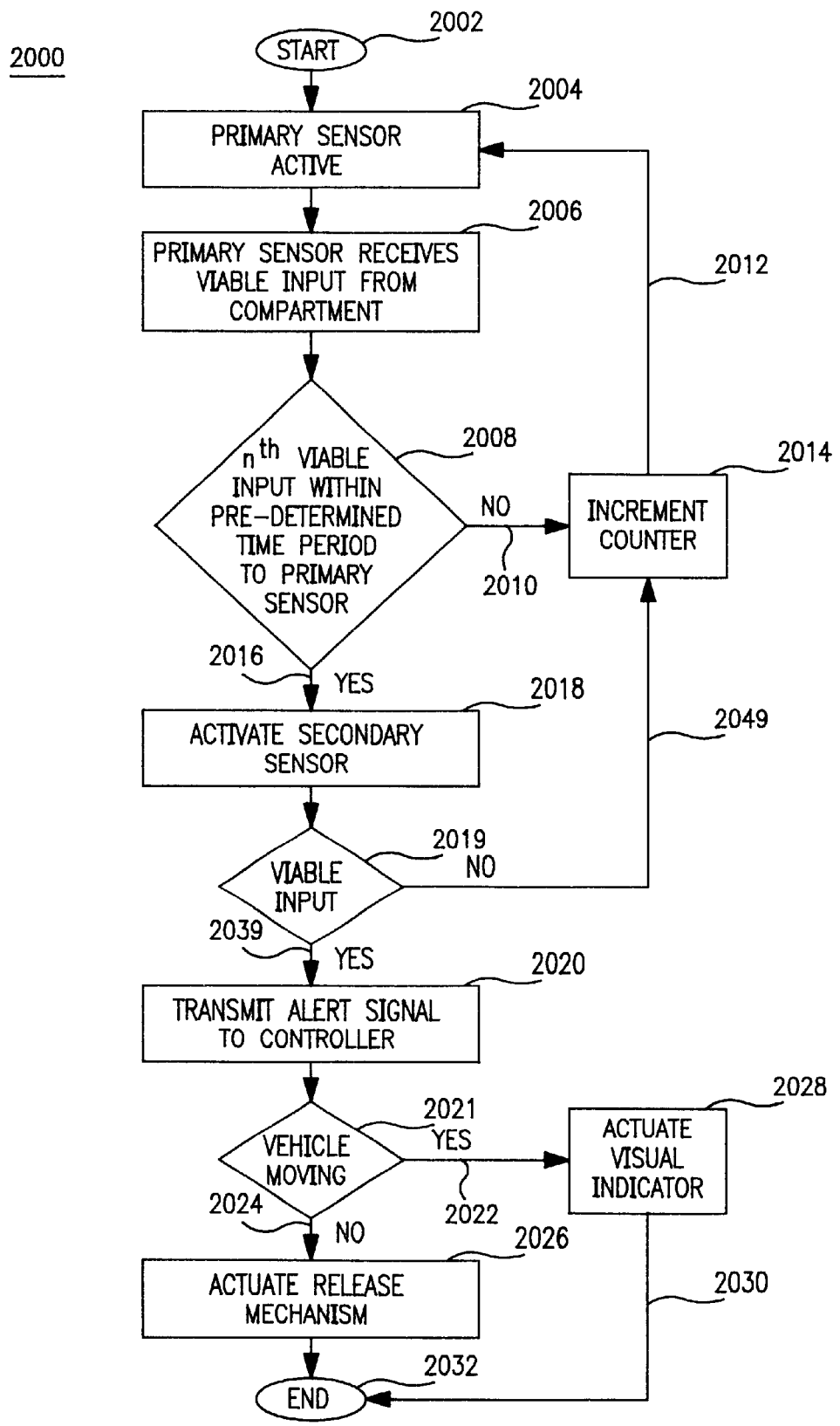
FIG. 2 is a flowchart showing activation of primary and secondary sensing devices.

FIG. 2 is a flow chart 2000 showing steps using primary sensing mechanisms in conjunction with secondary sensing mechanisms to generate an alert condition. These steps are suitably stored on a computer readable medium. This has the advantage that only a minium number of sensors (i.e., primary sensors) need to be constantly monitoring a compartment area. The primary sensors suitably alert the secondary sensors when the primary sensors sense viable input. This reduces the possibility of false triggers because the secondary sensors confirm that an alert condition is present prior to the controller generating an output to a destination such as an indicator or a trunk release. The steps shown in FIG. 2 are used with primary and secondary sensors that have the capability to determine whether the sensed input is a viable signal. Once that determination has been made by the primary sensor(s) the primary sensor(s) send a primary output signal to the secondary sensor(s). The secondary sensor(s) then begin sensing the compartment area. The secondary sensor(s), where appropriate, transmit a secondary output signal to the controller. The controller uses the secondary output signal to activate a trunk release, illuminate a light source, illuminate an indicator or some other action as described herein.

Alternatively, it is also an embodiment of the invention that the primary sensor(s) transmit all sensed inputs to the controller and the controller determines when to actuate the secondary sensor(s). The secondary sensor(s), once actuated, would transmit all sensed inputs to the controller and the controller determines when an alert condition (i.e., adequate quantity of viable signals within a predetermined period of time) is sensed, and thereby transmit a control signal to a destination.

As shown in FIG. 2, block 2002 is a start block. Block 2004 shows that one or more primary sensors are active to continuously monitor either the cargo compartment or the passenger compartment of a vehicle. The primary sensors are typically low power consumption sensing devices to reduce power drawn by the sensing system. Block 2006 shows that the primary sensor receives viable input from the compartment. Decision block 2008 determines whether or not the number of viable signals received from the primary sensor exceed a predetermined number within a predetermined period of time. Thus, block 2008 helps determine whether a human is being detected. If not line 2010 shows that a counter is incremented as shown in counter box 2014. Line 2012 shows the counter, which has been increased transmits the quantity of signals to block 2004. If a viable signal has been detected line 2016 shows that a secondary sensor is activated as shown in block 2018. The secondary sensors then begin receiving input from the compartment and each of the secondary sensors determine whether or not a viable signal is detected, as shown in block 2019. If not, line 2049 leads to counter block 2014, to increment the counter.

When the secondary sensor(s) determine that a viable signal has been received, a secondary sensor alert signal is sent to controller as shown in block 2020, via line 2039. Block 2021 is a decision block for determining whether or not the vehicle is moving. If it is, line 2022 shows that a visual indicator is actuated. This is typically a tell/tale light as described herein. Line 2030 shows that the process goes to end block 2032. If the vehicle is not moving, line 2024 leads to block 2026 which actuates a release mechanism, which is typically a trunk release mechanism to open the trunk. End block 2032 is then reached.

Figure 3:
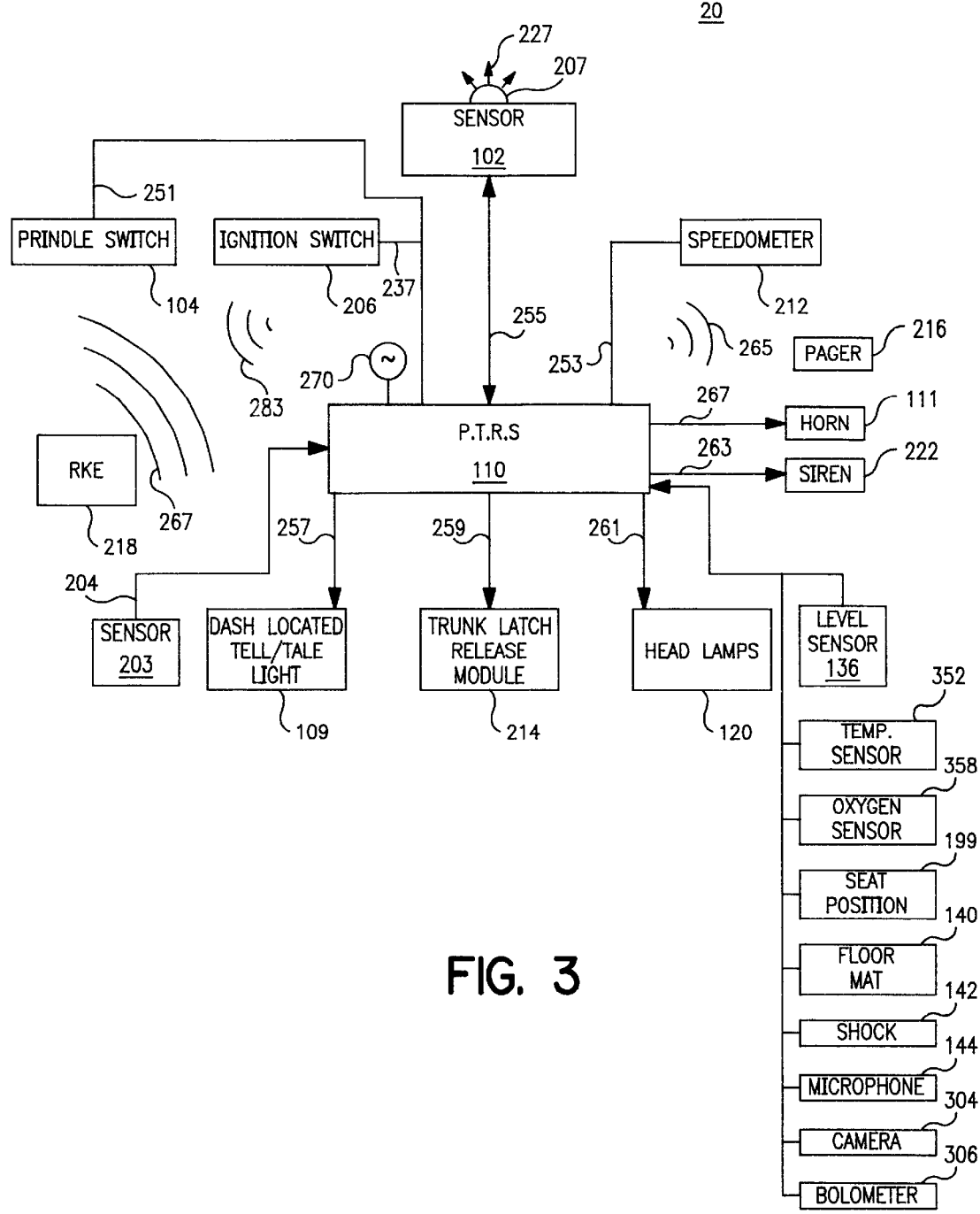
FIG. 3 shows a block diagram of the components of a compartment sensing system.

FIG. 3 is a diagram showing the components of an exemplary compartment sensing system 20. System 20 includes sensor 102 coupled to a light emitting diode (LED) 207 for emitting light energy 227. This device provides illumination and may illuminate a release mechanism, for example a symbol or text such as "pull here" which will release the trunk lid. This LED 207 also suitably flashes when a human is detected and thereby attract the trapped human closer to the sensor 102 and increase the signal strength. The sensor 102 also suitably detects variations in a thermal profile of a compartment. Thus, sensor 102 detects how the thermal profile varies over time; specifically detection of an instantaneous rate of change of temperature (T) with time (t) (δT/δt). The system 20 can also be used with a manual handle (shown as element 134 in FIG. 1) which when pulled provides an exit path from the compartment.

The sensor 102 is coupled to control module 110 shown as PTRS module, via bidirectional interconnector 255. The PTRS module 110 (also referred to as controller 110) receives alert signals from the sensor 102 and actuates LED 207. The PTRS module 110 is coupled to the transmission gear selector commonly called PRNDL switch 104, via interconnector 251. Interconnector 251 is suitably a wire. Ignition switch module 206 and the speedometer module 212 are coupled to PTRS module 110 via interconnectors 237 and 253, respectively. The Prindle switch 104, ignition switch module 206 and speedometer module 212 generate signals indicative of their current state of operation and transmit them to the PTRS module 110. The PTRS module 110 utilizes these signals to determine whether to generate an alert signal and/or latch release signal.

PTRS module 110 outputs a control signal to tell/tale indicator 109, which is typically located on the dashboard of the vehicle, via interconnector 257. The PTRS module 110 is also capable of outputting an actuating signal to the trunk latch release module 214 via interconnector 259. The trunk latch release module 214 includes a motor and a trunk latch, shown herein as elements 202 and 114, respectively. The actuating signal is used to release a trunk lid from a closed position to an open position. The PTRS module 110 outputs control signals to other destinations such as headlamps 120, siren 222 and horn 111 via interconnectors 261, 263 and 267, respectively. The PTRS module 110 is also designed to transmit signals 263 to a remote receiver 218, such as a remote keyless entry module (RKE). These signals 263 are used to actuate the RKE module so that the trunk lid is opened. The PTRS module 110 also transmits signals 265 to pager 216 that outputs an indication that the sensor 202 has generated an alert signal. This indication could be text or a number code displayed on pager 216.

The sensor 102 and or PTRS module 110 also may receive signals 267 from a remote keyless entry module 218. This enables a user to activate an alert signal from a remote location. The PTRS module 110 is coupled to the Prindle (PRNDL) switch 104, via interconnector 251. Interconnector 251 is suitably a wire. Ignition switch module 206 and the speedometer module 212 are coupled to PTRS module 110 via interconnectors 237 and 253, respectively. The Prindle switch 104, ignition switch module 206 and speedometer module 212 generate signals indicative of their current state of operation and transmit them to the PTRS module 110. The PTRS module 110 utilizes these signals to determine whether to generate an alert signal.

The compartment sensing system 20 can be packaged with other trunk components such as a trunk light, an RKE system, and a spare tire assembly to decrease packaging and space requirements.

The sensor 102 can also sense ambient light and in a situation in which the trunk volume, shown as 105 in FIG. 1, is not dark, the sensor module 102 and PTRS module 110, will not activate the light source 207.

Additional sensors shown as sensor 203, which are similar to sensor 102, may be used for additional detection. Alternatively, the additional sensors 203 are any combination of the types of sensing mechanisms described herein.

Power supply 270 is suitably an auxiliary power supply. Power supply 270 is connected to PTRS module 110 and provides power to PTRS module 110. Alternatively, any suitable power supply voltage is acceptable. Specifically, it is an embodiment of the invention to utilize a 42 volt power supply.

Temperature sensor 352 provides input to the PTRS module 110. This input is indicative of the sensed ambient temperature in the vehicle cargo compartment or passenger compartment depending on the location of the sensor 352. The system 20 receives temperature input to determine if a hazardous condition exists in the interior of a vehicle due to heat. If the temperature module 352, senses that the vehicle passenger compartment exceeds 70 degrees Fahrenheit, and an alarm condition is generated, the system 20 might also start the car engine and automatically turn on an air conditioning system in the vehicle, opens automatic windows of the vehicle and/or unlock the doors of the vehicle. Seat position sensor 199, level sensor 136, oxygen sensor 358, shock sensor 142, microphone 144, camera 304 bolometer 306 and floor mat sensors 140 also provide input to the PTRS module 110 indicative of the various conditions. (See discussion relating to FIG. 1.)

Any combination of the above-listed sensors used to provide input to PTRS module 110.

The system 20 suitably functions as an anti-theft alarm system when sensors 102 and 203 are mounted in the passenger compartment of the vehicle (shown as compartment 130 in FIG. 1). Sensor 202 is suitably mounted in the dome light or overhead console to sense the presence of a person or animal. When a person or animal is sensed, an alarm condition is generated as described above.

Figure 4:
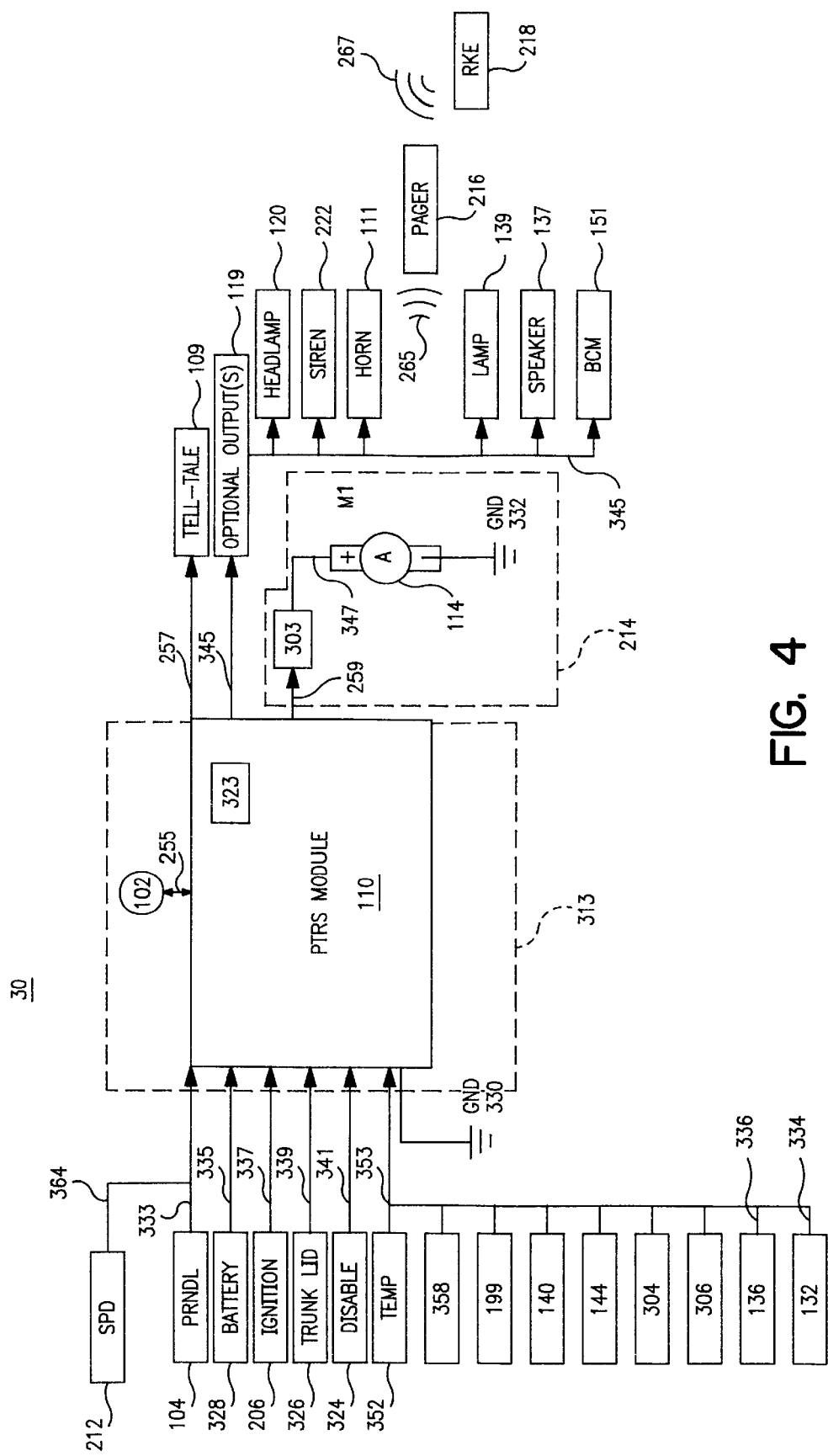
FIG. 4 is a block diagram of a PTRS module and associated components.

FIG. 4 shows a PTRS module 110 with a thermal detector module 102 coupled thereto via bi-directional interconnector 255. The combined PTRS module 110 and detector module 102 forms a detection device 313. The detection device 313 utilizes inputs from various input modules to generate one or more outputs. The detection device 313 is coupled to the input modules and output modules through any one of a variety of transmission means. Although nearly all the interconnections are shown as wires, for reasons of clarity, it is apparent to those skilled in the art that other transmission means can also be used. For example, electro-optical coupling, a wireless transmission means such as radio frequency (RF), Infrared (IR), or microwave. A wireless broadcast network could also be used, a wired network bus, local area wireless network as well as a car area network, controlled area network, local area network. In a preferred embodiment, a protocol such as BlueTooth™ from Motorola™ is used. Types of transmission means for transmitting signals within a vehicle are disclosed in co-pending patent application entitled, "Interior Rearview Mirror Sound Processing System" filed Dec. 17, 1999, by J. Deline et al. (attorney docket No. P-787), which is hereby incorporated by reference in its entirely herein. The inputs provide indications of the status of system 30, which is typically disposed in an automobile, and include, for example, whether the automobile is running or whether the trunk lid is open. Parameters that can be used for the detection device 313 to make a valid decision as to whether or not to actuate the trunk release 114 typically include, status of deck lid (open or closed) ignition switch (on or off), transmission state (PRNDL), vehicle speed, temperature inside trunk, supply voltage at the sensor, time and date when signal triggered, and oxygen level and/or carbon monoxide level in the vehicle compartment.

FIG. 4 shows detection device 313 receiving power from battery 328 via wire 335. The battery 328 is suitably the vehicle battery and/or an auxiliary power supply to power the PTRS System 30. Ignition module 206 provides input to detection device 313 via wire 337. This input is indicative of the whether the engine of the vehicle is running. Input from a trunk lid module 326, which indicates the position of the trunk deck, is received by detection device 313 via wire 339. Speedometer module 212 is coupled to detection device 313 via interconnector 364. Speedometer module 212 produces a signal indicative of whether the vehicle is moving, and more specifically, at what speed the vehicle is moving.

Oxygen sensor 358 is used to sense the amount of oxygen in a compartment. The oxygen sensor 358 transmits a signal indicative of the oxygen level in the compartment to detection device 313 via interconnector 360. The detection device 313 utilizes the output from the oxygen sensor to determine how quickly to actuate trunk release mechanism 114. For example, when the oxygen level is below a pre-determined threshold, the detection device 313 will generate a release signal to actuate trunk release mechanism 114 more quickly. This reduces the likelihood that a person trapped in a compartment will suffocate.

Alternatively, oxygen sensor 358 is used to sense the level of carbon monoxide in a compartment. In a situation in which the carbon monoxide level exceeds a pre-determined threshold, the detection device 313 will actuate the trunk release mechanism 314 more quickly than when there is no threat of carbon monoxide poisoning to a human being or other animal.

Car seat sensor 143 also increases sensitivity when present. It is an embodiment to utilize a car seat sensor 143, coupled to controller 110. Car seat sensor 143 is mounted in the passenger compartment and senses if a child car seat is present. Also, a user can set the unit 143 when installing a child-safety car seat. The child/infant car seat sensor 143 is used to direct special attention to movement in that area. Infants left alone in a car seat have limited motion since they are strapped in a particular location. The car seat sensor 143 provides additional protection against a child being left in a child/infant car seat inadvertently.

Level sensor 136 is coupled to detection device 313 via interconnector 336, seat position sensor 199 is coupled to detection device 313 via interconnector 399, motion sensor 132 is coupled to detection device 313 via interconnector 334 and RKE module 218 provides signals 267 to detection device 313.

Floor mat sensors 140, microphone 144, camera 304 and bolometer 306 also provide input to detection device 313. The interconnectors are not numbered, but are apparent to those skilled in the art.

Disable signals indicative of the operating status of one or more peripheral modules are transmitted from disable module 324, via wire 341 to detection device 313. The disable module 324, which is suitably a switch for disabling the system 30 can be activated by a user to prevent the detection device 313 from generating a trunk release signal. This enables a user to deactivate the system 30. The disable module 324 is typically located on the detection device 313 or alternatively on the dashboard of the vehicle. Although only one disable module is shown it is apparent to those skilled in the art that a plurality of disable modules may be used with the present invention. A disable module 324 may be coupled (interconnections not show) to one or more of the peripheral modules to disable selected peripheral modules.

Also, each peripheral module can have a disable switch so that a user can disable any particular module or combination of modules that they wish to disable. Although the individual disable switches are not shown, it will be apparent to one skilled in the art that the disable switches are part of each peripheral module.

There may be instances when it is desired to have the system 30 non-functional, such as when traveling with pets in the trunk. In order to assure safety, the system 30 is programmed to reset with every ignition cycle and/or every trunk lid opening so that the operator does not forget that the system 30 was turned off. Also, the detection device 313 is suitably programmed so that the disable module 324 is disengaged when the keys are in the ignition and/or, when the car is running so that a young child would not be able to disarm it. When the disable module 324 is activated, such as pushing and holding an "ON/OFF" switch down, with the deck lid closed and/or the rear seats up, the system 30 will recognize this as a trapped human and will immediately activate a response, such as open the trunk lid, flash lights 120, and/or honk the horn 111. When the system 30 is disabled, the tell/tale light 109 is suitably continuously lit to signal an operator of the vehicle that the system 30 is disabled.

Another function for the disable module 324 is a panic-mode button. In this case, depressing the button 324 and holding the button down, would immediately release the trunk lid as opposed to waiting a pre-determined period of time specified by an algorithm. This would grant the victim immediate release from the trunk.

A self-test feature using a self-test button 323 is used to demonstrate that the system 30 is operational. In this mode upon depressing the button 323, the system 30 would signal that it is operational by, for example, an audible sound, a dashboard light, and/or a blinking LED. One could enter self-test mode by pressing the self-test button 323 on the detection device 313 for a specified length of time or self-test mode could be performed with every ignition cycle. One example of a potential self-test protocol could be as follows:

To initiate the self test the deck lid must be open.

Hold the self-test button 323 down for 10 seconds, chirp the horn once at 2 seconds chirp horn 3 times at 10 seconds to indicate the self-test mode hand wave to cycle the latch release mechanism and to reset the system.

The detection device 313 also suitably receives input from PRNDL module 104 via wire 333. The signal from PRNDL module 104 indicates whether the wheels of the vehicle are engaged. The detection device 313 processes the received inputs to generate one or more output signals. For example, if the trunk lid module 326 senses that the trunk is in the open position, the detection device 313 will not generate a signal to actuate trunk release latch 114, since the trunk lid is not closed. Similarly, if the detection device 313 receives a signal from the PRNDL module 104 that the wheels of the vehicle are moving, the detection device 313 will not actuate the trunk release latch 114 since opening the trunk of an automobile while the automobile is moving would present a potential safety hazard.

In a situation in which the vehicle is moving, the detection device 313 would generate a control signal to an indicator. For example the detection device 313 would output a signal to a tell/tale indicator 109 via interconnector 257. The tell/tale indicator 109 illuminates and thereby provides notification to the operator of the vehicle that an alert situation has been detected, for example a child in the trunk. The operator could then manually open the trunk once the vehicle is stopped.

The detection device 313 is also capable of generating a control signal to activate other destinations. These destinations include indicators described in relation to FIG. 3 and are shown as headlamp 120, siren 222, horn 111, lamp 139, Speaker 137, BCM 151, and pager 216 via signals 265. Depending on the type of vehicle the system output may vary. For some vehicles, the trunk lid can be released through the Body Control Module (BCM) 151. The BCM 151 release of the deck lid will require the PTRS system to ground an output to the BCM 151. For other vehicles, the deck lid must be released directly. The detection device 313 would then supply a pulse to the rear compartment lid motor 303, via interconnector 259. Other indications shown as optional outputs 119 are activated via interconnector 345. These optional outputs include for example, a cellular phone call, and ONSTAR™ signal.

The trunk release module 214, which is typically a motor 303 and a latching mechanism 114 for attaching the trunk lid to the vehicle, is actuated upon receiving a control signal, via interconnector 347, from detection device 313. In this embodiment the trunk lid input 326 sends a signal to the detection device 313 indicating that the trunk lid is not in the closed position. If the trunk lid is open, the detection device 313 will not actuate trunk release module 214.

Figure 5:
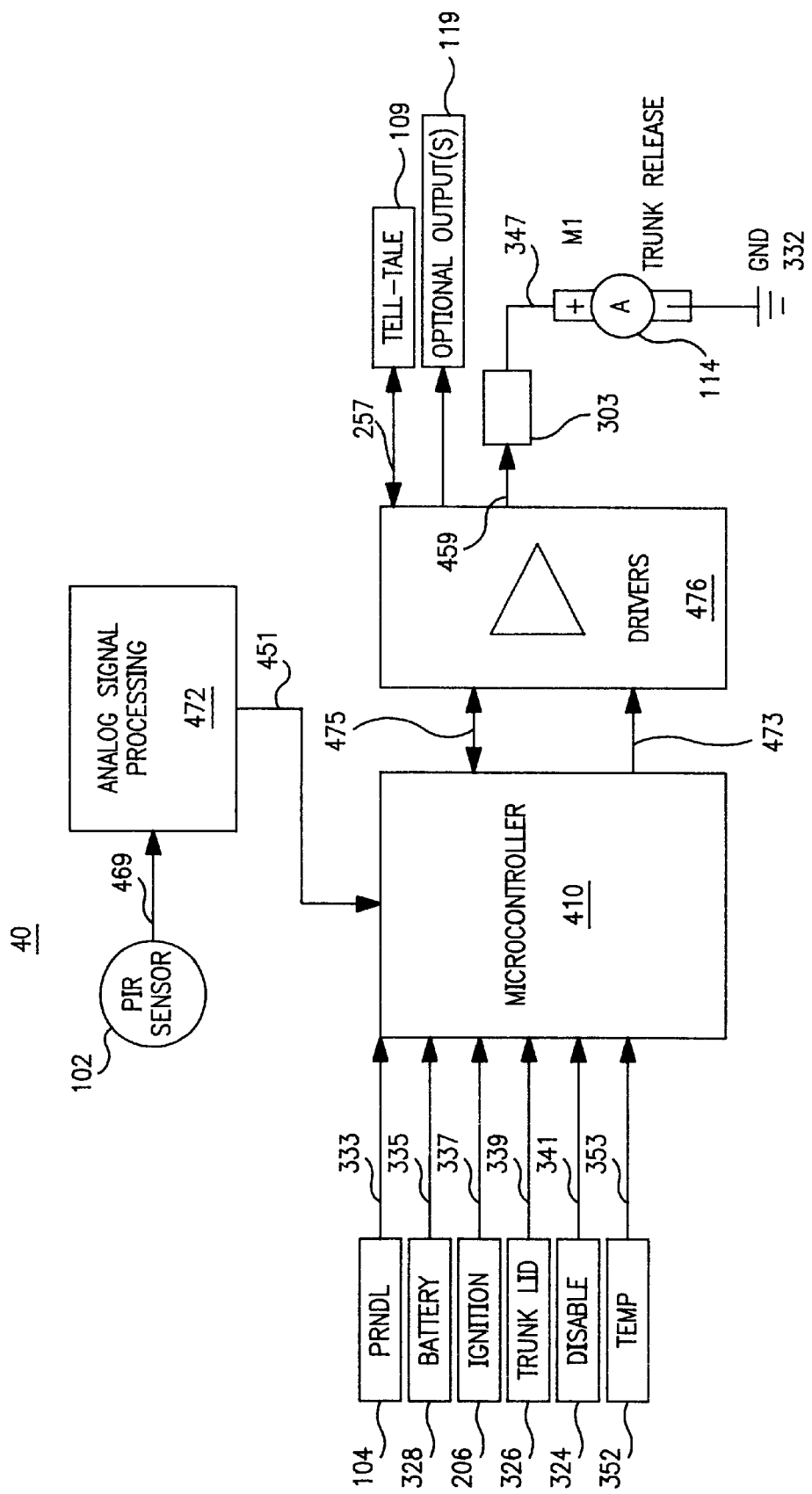
FIG. 5 shows a second embodiment of the compartment sensing system.

FIG. 5 depicts compartment sensing system 40. FIG. 5 specifically shows a microcontroller 410 and drivers 476 for generation of control signals. System 40 includes PIR sensor 102 for determining a thermal profile in a compartment. The PIR sensor 102 transmits a signal representing sensed ambient conditions in a compartment to analog signal processing unit 472, via interconnector 469. Analog signal processing unit 472 processes the input and transmits a signal generated as a function of the thermal profile to microcontroller 410, via interconnector 451. Microcontroller 410 also receives inputs from battery 328, via interconnector 335, trunk lid module 326 via interconnector 339, transmission gear switch (PRNDL module) 104, via interconnector 333, ignition module 206 via interconnector 337, disable module 324 via interconnector 341 and temperature module 352 via interconnector 353. Also, other inputs such as speedometer, floor mats, camera, bolometer, level, motion, microphone and oxygen sensors are also utilized as shown in FIG. 4. The microcontroller 410 outputs signals to driver unit 476 via bidirectional interconnectors 473 and 475, which are suitably wires. Wires 473 and 475 are each two wires for bidirectional communication between microcontroller 410 and driver unit 476.

The driver unit 476 transmits signals from the microcontroller 410 to output indicators such as,. tell/tale indicator 109, and optional outputs 119.

Other output indicators such as horn, headlamps, siren and pager as discussed above are also utilized. The tell/tale light 109 also transmits a signal to driver 476 via bi-directional interconnector 257 indicating the status of the tell/tale light 109. The driver unit 476 also outputs a control signal to trunk motor 303, via interconnector 459 to actuate the opening of the trunk latch 114. Thus, the microcontroller 410 will actuate the trunk latch 114 on reception of an alert signal generated by the PIR sensor 102.

Figure 6:
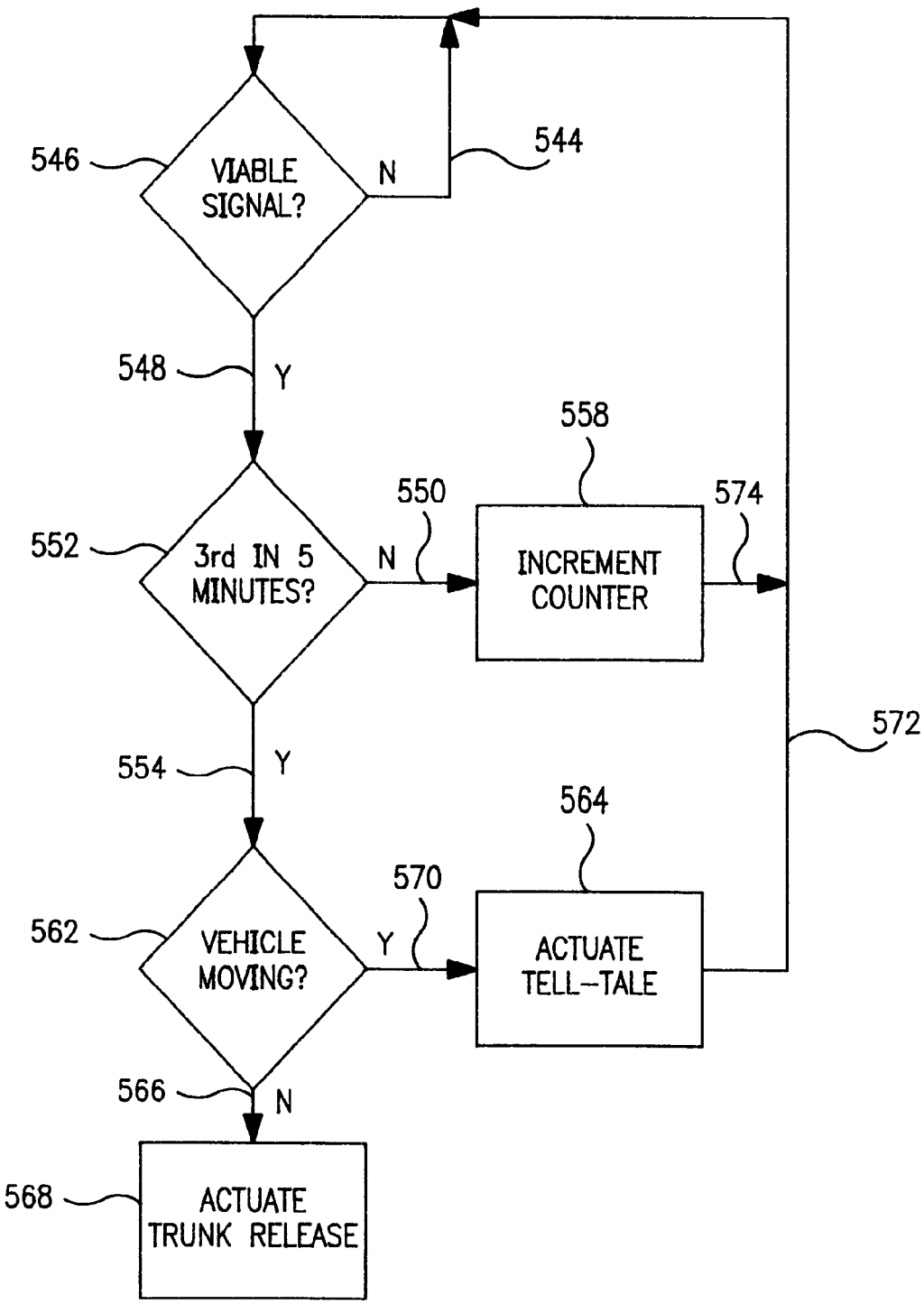
FIG. 6 shows a trunk release algorithm.

FIG. 6 shows trunk release algorithm 50 to actuate a trunk release upon detection of a viable signal. These steps are suitably programmed and stored on a computer-readable medium. A viable signal is a signal that is produced upon detection of an event. Viable signal decision block 546 receives input from increment counter block 558 and actuate tell/tale signal block 564 via lines 574 and 572 respectively.

The viable signal block 546 outputs a signal via line 544 if there are no events sensed by the sensors described above. An event is typically a detected activity detected by one or more of the sensors. For example, a thermal detector would designate an event as a sensed change in thermal characteristics of a compartment. If the viable signal module 546 receives an event signal from the sensor (not shown) it transmits a signal to the checking module 552 via line 548. Checking module 552 makes a determination whether or not a pre-specified number of viable signals have been received in a predetermined period of time. If this is not the case, a signal is transmitted on line 550 to increment counter block 558.

Increment counter module 558 accumulates the quantity of viable signals received until the quantity exceeds a predetermined quantity. The increment counter module 558 sends output to viable signal module 546 via line 574. If the criteria for a viable signal is met, a notification signal is transmitted on line 554 to a vehicle moving decision block 562. The vehicle moving decision block 562 senses whether or not a vehicle is in motion. If the vehicle is moving, the vehicle moving block will not acuate a trunk release and thus prevent the trunk of a vehicle from opening. This is a safety feature to prevent the trunk from opening when the automobile is moving. If the vehicle moving block 562 senses the vehicle is moving, it will transmit a signal to a tell/tale indicator 564 via interconnection means 570, which is suitably a wire, thereby providing an indication that a person or pet may be trapped in the trunk.

If the vehicle moving block 562 does not sense that the vehicle is in motion when a notification signal is received from checking module 552, vehicle moving block 562 transmits a signal to actuate trunk release module 568 via line 566. Thus, if a person or animal is sensed in the trunk, and the vehicle is not moving the trunk latch will be released, permitting escape.

Figure 7:
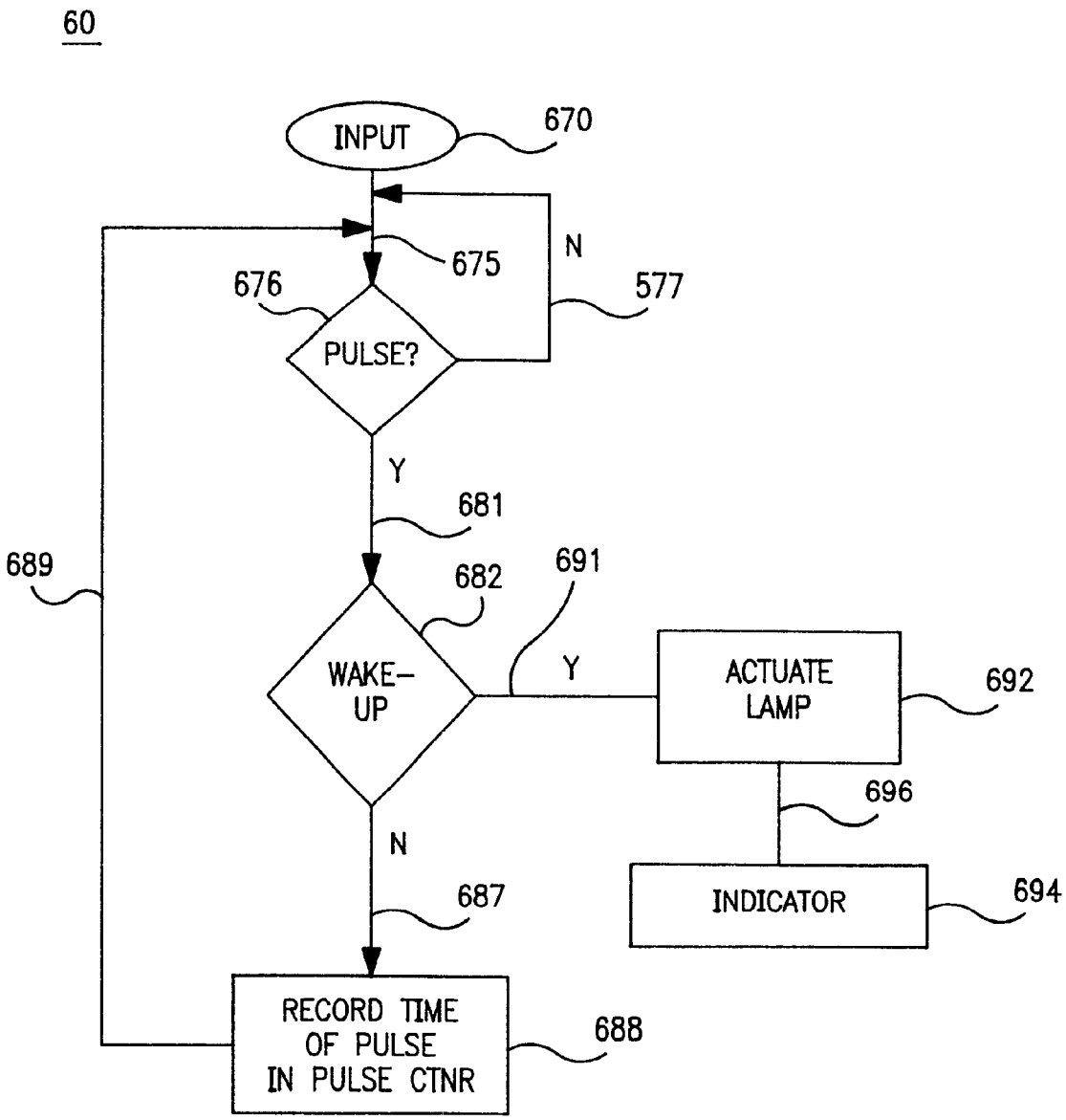
FIG. 7 shows a light source control algorithm.

FIG. 7 shows a flow chart 60 for controlling a light source mounted in a compartment upon detection of a person or animal in the compartment. This embodiment is suitably used with the latch release mechanism described above. Alternatively, this embodiment is used without the latch release feature and provides light to illuminate a compartment such as a trunk when a person is sensed in the trunk. When a person is sensed in the trunk and the trunk is closed, a light source, mounted in the trunk will be actuated. This permits illumination in the trunk, and thereby facilitate release. In this embodiment, rather than releasing a latch, a light source is activated to enable a trapped person to see in the closed compartment. The apparatus discussed in relation to FIG. 4 is readily modified to include only the components necessary to actuate a light source (light source shown as lamp 139 in FIG. 4).

FIG. 7 shows a flowchart 60 of steps that are suitably programmed on a computer-readable medium. These steps are used to actuate a lamp when a viable signal is sensed. Input block 670 receives input from a sensor (not shown), such as a PIR sensor shown as element 102 above. The input block 670 outputs a signal to pulse decision block 676 via line 675. The pulse decision block 676 determines whether or not there is a viable pulse sensed or whether noise or interference has been sensed. If the pulse is not viable, feedback loop 577 receives a signal to check the pulse signal again. If a viable pulse has been determined a signal is transmitted to wake up decision block 682 via line 681. The wake up decision block 682 determines whether or not a pre-specified number of viable pulses has been received in a pre-specified period of time. If this condition is not met, the wake up decision block 682 transmits a negative signal to record the time of pulse to timekeeping block 688 via line 687.

The recorded time of pulses is transmitted via line 689 to be input to pulse decision block 676. If the predetermined number of viable pulses has been exceeded in a pre-specified period of time, a wake up signal is transmitted to actuate lamp block 692 via line 691. This causes a light source, such as an LED or lamp, described above or other illumination device to illuminate a compartment. If the light source is illuminated, a signal is sent to an indicator, such as a tell/tale light in the passenger compartment indicating that the lamp in the trunk is "ON". This is shown as line 696 to tell/tale indicator block 694.

An air pocket trapped between lens and sensor provides a cavity between the thermal sensor and lenslet or lens surface 713. This air pocket insulates the sensor from fluctuations in temperature.

Figure 8:
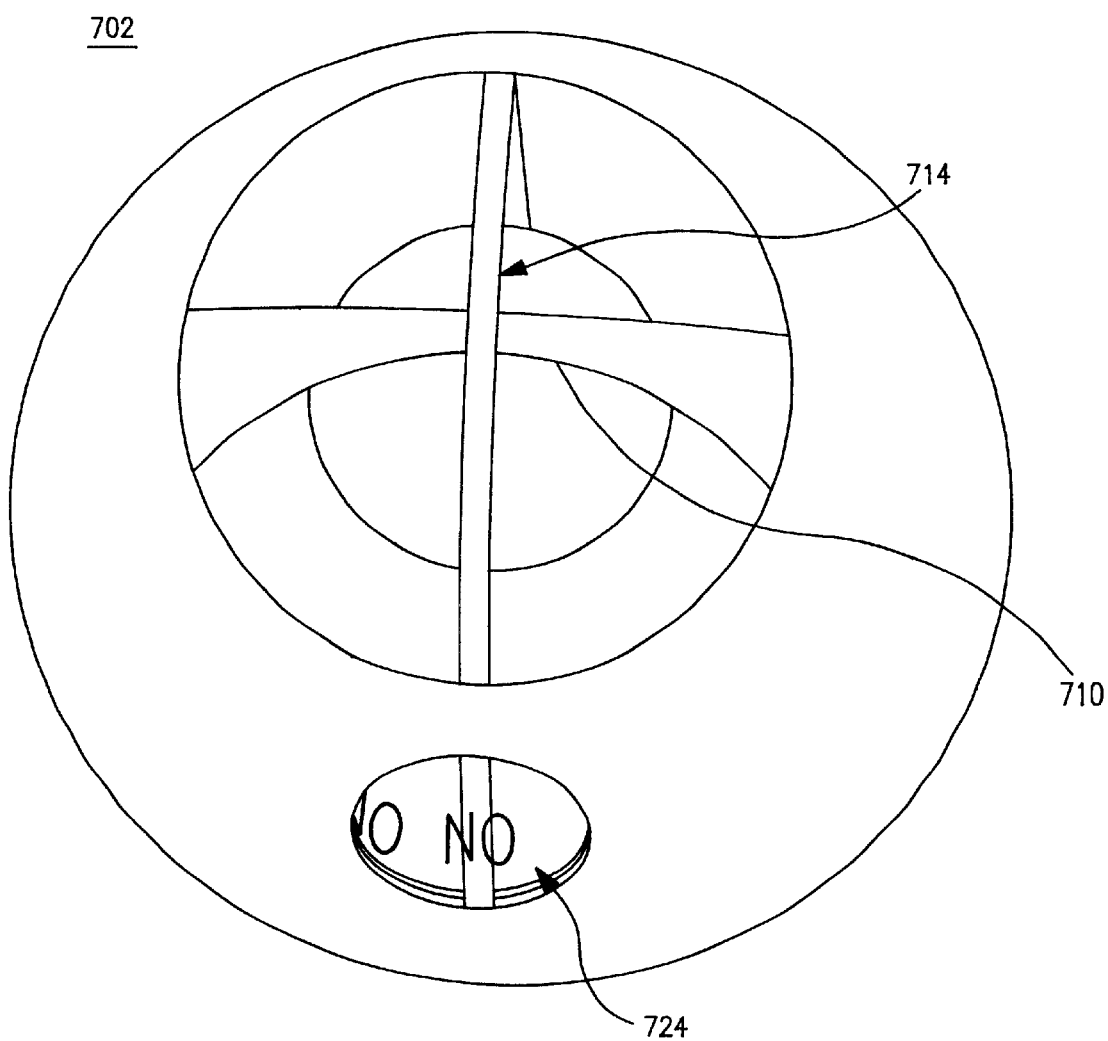
FIG. 8 shows a perspective view of a detector module used with the instant invention.

FIG. 8 shows an overview of a sensing unit 702. The sensing unit 702 includes sensor (not shown) with an LED (not shown) and an optic lens. The lens can be made of polyethylene or any other material which provides adequate IR transmission. A housing or guard 710 protects the optic lens. The housing 710 can be made from polypropylene, ABS or any other material which demonstrates adequate strength requirements. The housing 710 protects the lens and also provides a thermal barrier to decrease false alarm conditions. The sensor is preferably disposed behind the lens.

An enable and disable switch 724 is provided for manual override of the sensing unit 702. The switch 724 for the on-off function is preferably recessed within the housing 710 so that it is not triggered accidentally. The LED or other illumination device is activated as described above and provides sufficient illumination to enable a trapped person to see inside the compartment or pull a manual handle. This facilitates the trapped person locating a release switch in the trunk, particularly if the trunk is dark. The sensing unit 702 is typically a removable unit, that can be repaired or replaced with minimum time and effort.

Ribs 714 provide a means of protecting the sensor and optic lens from being damaged by objects impacting the sensor and optic lens.

Figure 9A:
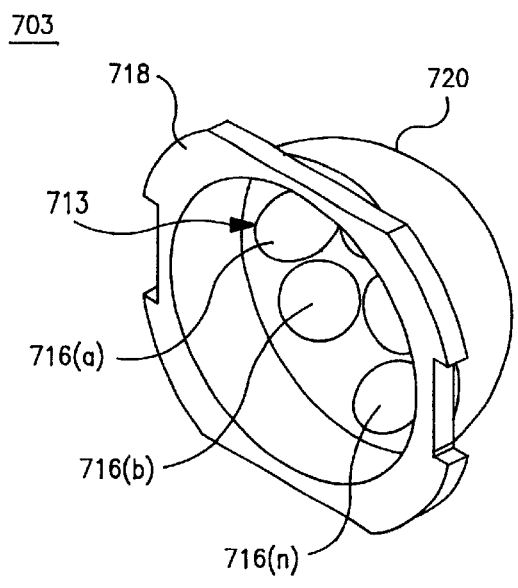
FIGS. 9A and 9B show perspective views of a lens used with the instant invention.
Figure 9B:
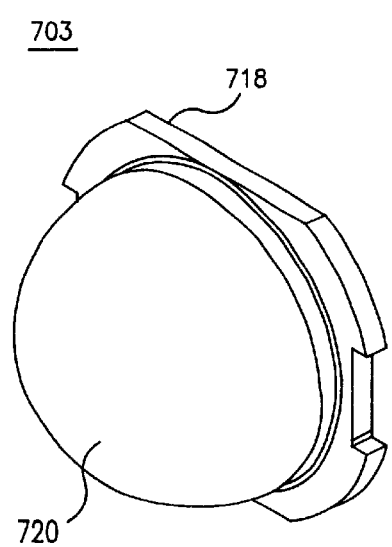

FIGS. 9(A) and 9(B) show schematic views of a lens 703 that is suitably used with the instant invention. FIG. 9A shows an interior portion of lens 703 and FIG. 9B shows an exterior portion of lens 703. In order to maximize the signal that pyroelectric elements sense from a defined object e.g. a human being or animal, such as a pet, the pyroelectric element of the signal is proportional to $f/(f/\#)^2$; $f/\#=f/D$ where f is the lens focal length, # is the lens number, and D is the diameter of the lens. The preferred signal has the shortest focal length possible along with a large diameter lens aperture.

As shown in FIGS. 9A and 9B, a plurality of lenslets 716($a$) . . . (n) (where n is any suitable number) are used to form lens surface 713 and increases the sensing ability of the device. An optical design consideration is the magnification of the object caused by the lenslets 716($a$) . . . (n). Due to the preferred detector arrangement of two electrically opposed pyroelectric elements (not shown), the image of the object to be detected needs to be small enough so that the two signals from the pyroelectric elements add constructively. This requires the use of short focal length lenslets, which typically have a focal length between approximately 5 and 11 mm and preferably approximately 9.3 mm.

The focal lengths of the lenslets are chosen to be just short enough so as to provide an image that produces constructive interference between the two parallel electrically opposed pyroelectric elements. In some pyroelements the elements are in electrical series. Each individual pyroelectric element comprises a piezo-electric element. Preferably the polarity of the one is connected so as to oppose the polarity of the other so that when both are exposed to the same influence they mutually cancel. This feature enables the sensor to distinguish movement from ambient conditions. If the ambient condition is changing all lenslets on average sense the same. The diameter of the lenslets are then made as large as physically possible. Typically, the allowed diameter is constrained by the area of coverage required in the trunk area. Since one lens typically cannot cover the entire area, multiple lenslets 716 will be used that are located close to each other, similar to a fly's eye arrangement. The spacing of the lenslets 716 is determined by the size of the image. The purpose is to allow a sufficient gap between the field of view in neighboring lenslets 716 so that the image produces signals from the elements that add constructively.

The lens 713 arrangement typically looks similar to a fly's eye with between approximately 3–6 lenslets 716 across a diameter for a total number of lenslets 716 from approximately 9–36. The lenslets 716 will typically be between approximately 5–15 mm in focal length with diameters of between approximately 2–10 mm. In order to sense objects in the 8–14 micron range the lens surface 720 material will typically be a form of polyethylene. This material requires that the lens surface 720 have clear apertures that are less than approximately 1.5 mm thick and in the final product will be approximately 0.5 mm thick.

The amount of energy radiated by objects in the thermal area is not only proportional to temperature, but is also a function of the objects' emissivity. Thus even if objects in the trunk compartment and portions of the trunk compartment (where the objects in the trunk and portions of the trunk comprise background emissions) are at the same temperature, the objects and portions may not be emitting the same amount of energy. Since the sensors sense changes in the compartment, the fact that the background emissions (i.e., the objects and portions) may not be radiating uniformly, even when the objects and portions are at the same temperature, reduces the likelihood that a human being or pet will blend into the background and remain undetected. In order to take maximum benefit of this situation lenslets 716 are suitably aimed at particular locations in the trunk which are known to have different emissivities. Preferable background items to aim the lenslets 716 at are trunk carpet, black plastic and metal objects as well as other portions or objects in the trunk compartment that have a relatively constant emission.

Alternatively, the lenslets 716 could be aimed at portions of the trunk compartment that typically do not reach the same temperature as the majority of objects in the trunk. For example, particular locations on the trunk carpet may be thermally coupled to various portions of the vehicle body resulting in a different equilibrium temperature than the majority of the carpeted area. A different equilibrium temperature typically results in a different radiative output. This variation in output reduces the uniformity of the background and reduces the likelihood that a child could blend into the background and not be detected by the sensor. One preferred trunk area to aim the lenslets 716 is the spare tire compartment because of metal objects typically located there and a volume that forms a cavity.

Other features of the lens 703 include a continuous outer optical surface 720, spacing of the lenslets 716, thin wall sections, a protective ribbing for the lens, varying lens apertures and focal lengths using aspherics, auxiliary lens features and using short focal length lenslets 716 to increase stiffness.

Although refractive lens surfaces work in the trunk sensor application, alternatively, diffractive lens surfaces are also used instead of, or in conjunction with, refractive surfaces. A diffractive approach has the advantage of potential to balance-out chromatic aberrations. Thin lens sections would allow higher light transmission. Diffractive surfaces are easier to fabricate than they are for visible applications due to the larger diffractive surfaces used in the thermal infrared.

Refractive Fresnels

Fresnel lenses allow the introduction of thin lens sections for higher light transmission. Small Fresnel lenslets arranged in a roughly dome-shaped configuration are used.

Continuous Outer Optical Surface

FIGS. 9A and 9B show a lens 703 with continuous outer optical surface 720 having a smooth outer surface which is defined mathematically, for instance, a conic section or a two-dimensional polynomial function. It is preferred for the optical portion of the outer surface not to contain any discontinuities in its derivative. This allows the relative alignment between the outer and inner lens surfaces to not be as critical, thus reducing the manufacturing cost.

Spacing of Lenslets

Figure 10:
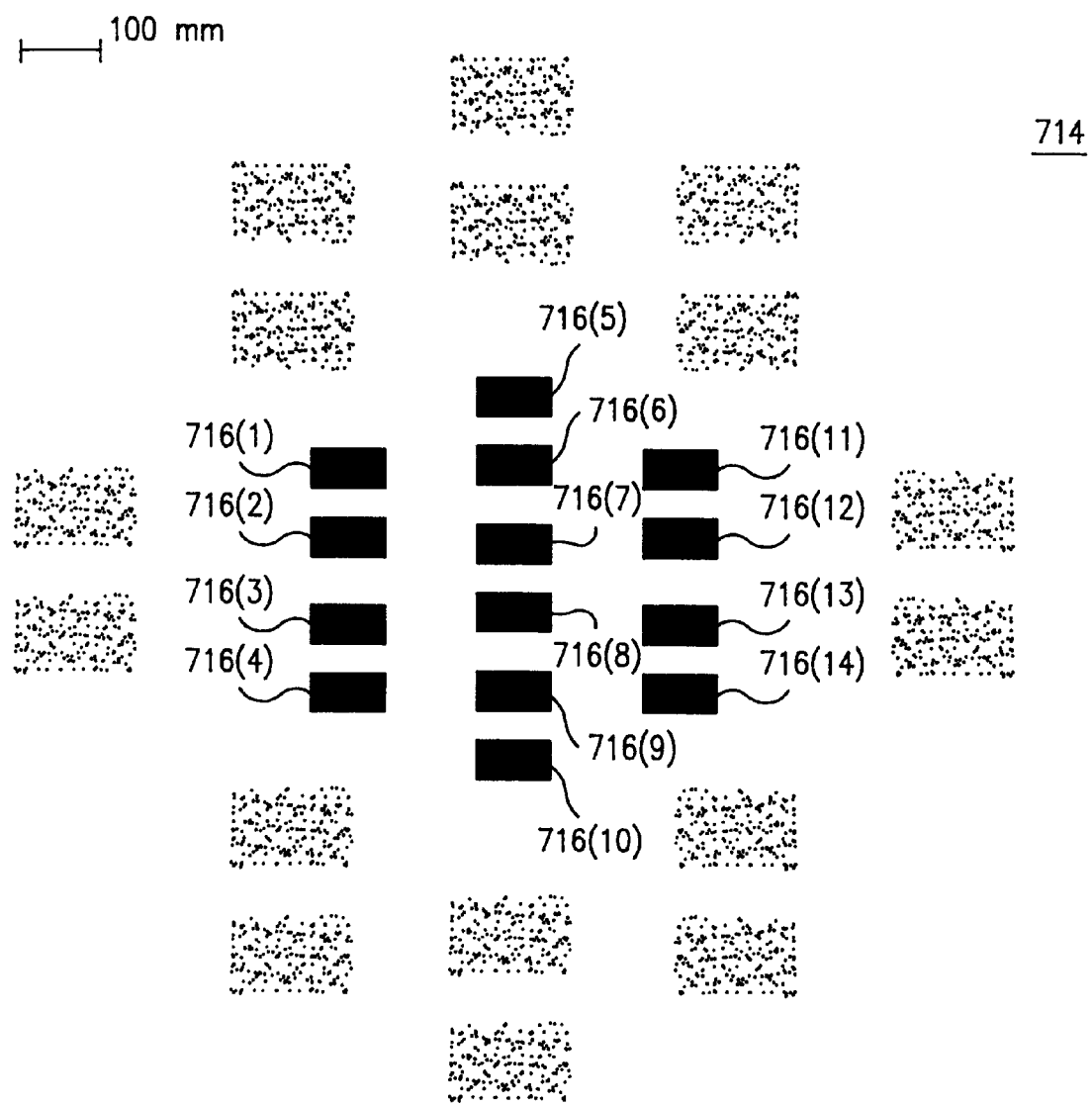
FIG. 10 shows a lenslet array used with the instant invention.

The use of a dual-element detector in lens applications utilizes a particular lenslet arrangement. The primary purpose of the lenslet 716 is to provide a large detector field of view. The lenslets 716 are typically arranged so that the projections of the two detector elements do not overlap. Partial overlapping could cause a reduction in signal intensity and a complete overlap could substantially diminish the signal intensity. The lenslets 716 are typically arranged so that an object moving in any direction will first cross the field of view of one detector element and then the field of view of another detector element thereby providing a maximum signal. FIG. 10 shows the projection of the elements through a 15 lenslet design showing lenslets 716(1) . . . (15). This arrangement has been optimized to detect horizontal and vertical movement.

Thin Wall Sections and a Large Optical Area

The signal received by the detector elements is proportional to $D^2 \exp(-A\, t)$ where D is the optical aperture diameter, A is a material constant, and t is thickness. Typically, in most optical designs the exponential term is insignificant. Most plastics do not transmit infrared light well. Polyethylene is an economically feasible plastic for the lens 720. In order to increase signal intensity, the lens thickness, t, must be as small as possible and the aperture diameter, D, as large as possible. If the lens surfaces 720 are continuous surfaces, not Fresnel surfaces for instance, then the large D and small t parameters drive the lens edge thicknesses to be quite thin. Typical magnitudes for D are between approximately 3–6 mm and preferably about 4.3 mm. Typical magnitudes for t are approximately between 0.7 mm–1.25 mm and preferably approximately 0.75 mm.

Protective Ribbing for Lens

Due to the lens wall thickness, the lens 720 may need to be protected from damage. Referring to FIG. 8, preferably this protection will be offered by the device housing 710 since the housing will typically be made from a stronger plastic, for example, glass-reinforced nylon, or acetal. The housing 710 will provide thin ribs 714 across the lens and partial ribs so as not to interfere with-the lenslets fields of view. In this way the lens is protected from deformation by most items and forces that might otherwise destroy and/or distort the trunk sensor lens.

Variation of Lens Apertures and Focal Lengths

As shown in FIG. 10, typically the trunk sensor interior lens surface 713 contains 15 separate the lenslets 716(1) . . . (15). To remove cosine effects the lenslet apertures and/or focal lengths could be changed. Varying the focal lengths is a feasible solution but requires that the outer lens surface (shown as element 720 in FIGS. 9A and 9B) be aspheric.

Use of Aspherics

Using aspheric surfaces can reduce spherical aberration, which is a source of aberration effecting the lens performance. Also, arranging the lenslets 716 so that they form a geodesic dome shape increases lens stiffness and is compatible with an optimum lens arrangement.

Auxiliary Lens Features

Since the trunk sensor lens 703 is typically fabricated from a pliable plastic, it is advantageous to include other mounting features and structures into it. Auxiliary features such as heat stake/orientation posts, a key-cap, and a mounting ring or plate facilitate mounting the sensor to either the trunk compartment or the passenger compartment of a vehicle. A mounting plate 718 is shown in FIGS. 9A and 9B.

Focal Length Lenslets for Stiffness

The lenslet 716 focal lengths not only effect the system's optical performance but its resistance to damage as well. Polyethylene, when used in thin wall sections (less than about 1.0 mm), is relatively pliable. The lens shape is designed to prevent lens damage. A hemispherical shape with a radius of about 12 mm or less increases lens strength, making it less vulnerable to damage when mounted in a car trunk.

Figure 11:
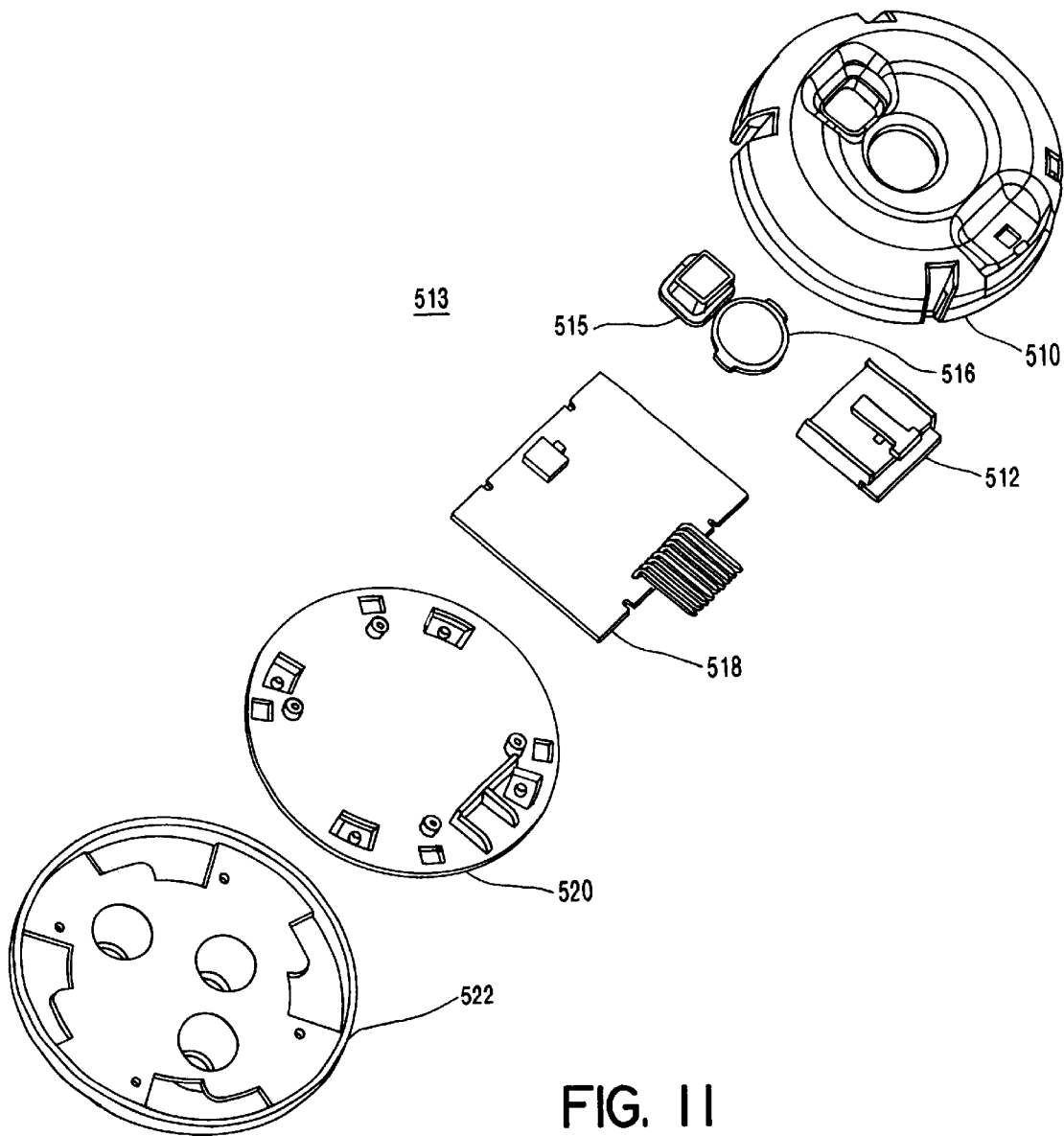
FIG. 11 shows an exploded view of a detector module used with the instant invention.

FIG. 11 shows an exploded view of detector 513. Detector 513 includes connector 512, a lens cover 510 and a base plate 520. Lens cover 510 and base plate 520 join together to form a housing. A lens 516 attaches to the cover 510. A printed circuit board (PCB) 518 is sandwiched between the cover 510 and the base plate 520. A clear button (on/off or panic) 515 is used to activate or deactivate the device 513. An LED (not shown) is situated behind the button 515 so it illuminates the button 515. The cover 510 conceals and protects the connector 512. The lens 516 is recessed in the cover 510 so it is protected from inadvertent damage by luggage and other objects in the trunk. Mounting device 522 is used to mount the detector 513 to a surface of a trunk compartment.

The PCB 518 suitably has a memory associated therewith to record and store the behavior of the device 513. Thus, the device 513 stores previous received signals and thereby decreases the possibility of a false alert situation because previous alarm conditions, i.e. state of peripheral modules, is stored in a memory on PCB 518.

Figure 12:
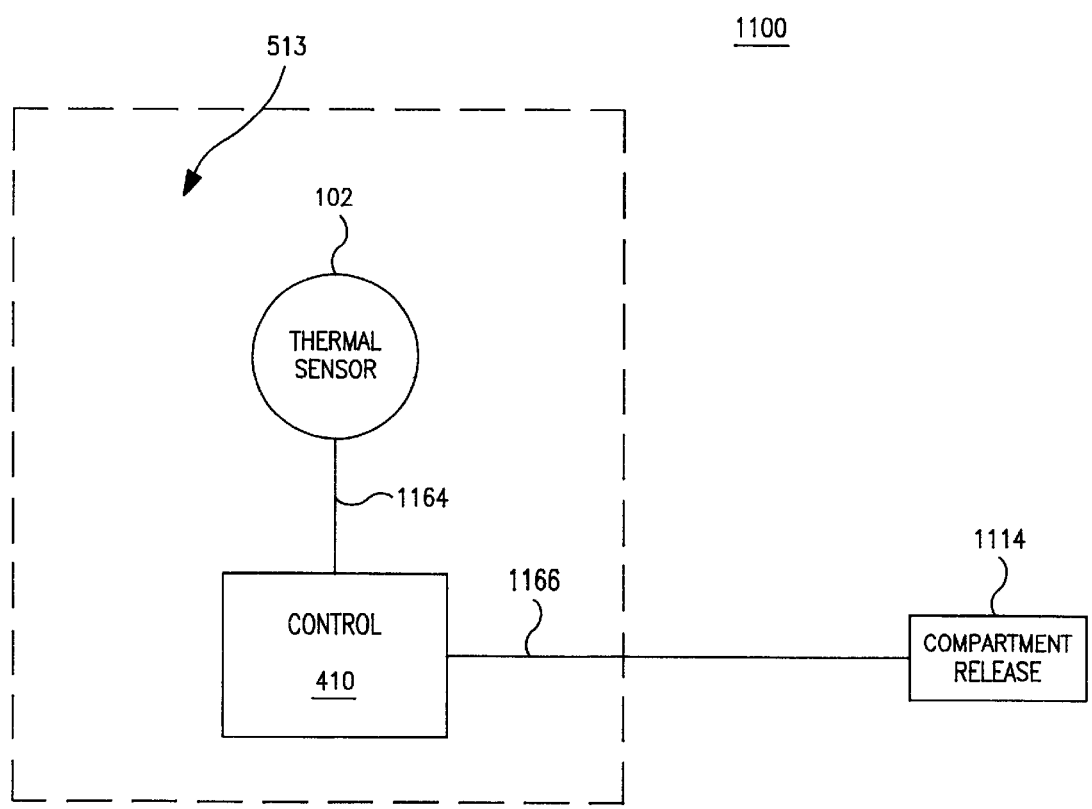
FIG. 12 shows a third embodiment of the compartment sensing system.

A specific embodiment of the present invention is shown in FIG. 12. The vehicle compartment occupancy detection system 1100 of FIG. 12 comprises a vehicle compartment occupancy detection assembly 513 and a compartment release 1114. Detection assembly 513 detects the presence of a living occupant within a compartment and preferably determines such occupancy by detection of movement by living beings (such as a child or an adult or a pet) within the compartment.

Preferably, vehicle compartment occupancy detection assembly 513 comprises a thermal detector 102 (such as a pyrodetector) that detects the differential in thermal energy generated by, for example, movement of a human having a body temperature typically at about 98.6 degrees Fahrenheit within the compartment. The ambient temperature within the compartment will mostly always be different than body temperature; for example, the air in a closed vehicle trunk compartment can reach a temperature of 150 degrees Fahrenheit, or higher, when parked in a hot climate, or as low as 20 degrees Fahrenheit, or lower, when parked in a cold climate. Thermal sensor 102, most preferably a pyrodetector, monitors the thermal characteristic of the internal volume of the vehicle compartment (such as the trunk space in a vehicle trunk).

Thermal sensor 102 generates an output signal 1164 indicative of the thermal characteristic of the compartment space being monitored. Signal 1164 is indicative of the thermal characteristic of the compartment and is provided to a control module 410, where it is processed to produce an output signal 1166 indicative of detection of occupant presence in the compartment. Signal 1166 causes actuation of compartment release 1114 (such as electrically powered retraction of a trunk lid latch to allow the trunk lid to open), thus allowing escape of the detected trapped occupant.

In an embodiment in which the compartment comprises a trunk of a vehicle, the vehicle compartment occupancy detection system comprises a passive trunk release system (PTRS). The passive trunk release system comprises a PTRS module as described in FIG. 3, that can be mounted within the trunk of a vehicle. Preferably, the PTRS module is mounted in the trunk at a location above the floor of the trunk in order to reduce potential damage from objects loaded into the trunk. Suitable trunk mounting locations include sidewalls, a front or a rear wall, the trunk lid that lifts when the trunk is opened and a trunk roof portion such as under the parcel shelf of the interior cabin. Locating the PTRS module at the trunk portion below the parcel shelf is a preferred location as this location is typically recessed and relatively stable to opening/closing of the trunk lid, yet provides a suitable field of view of the trunk interior.

Figure 13:
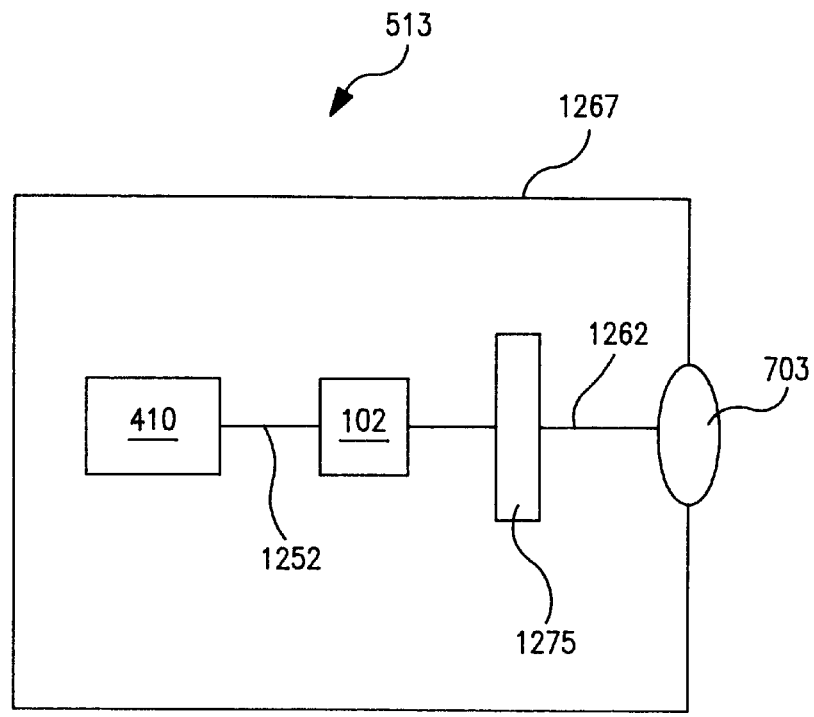
FIG. 13 shows a diagram of a detector module.

FIG. 13 illustrates an example of a PTRS detection module 513. The vehicle occupancy detection assembly 513 comprises a housing 1267, a lens 703, a filter 1275, as well as thermal sensor 102 and control module 410. Lens 703 is disposed in front of thermal sensor 102.

Filter 1275 may be disposed between thermal sensor 102 and lens 703 (such as is shown in FIG. 13), or may be disposed in front of lens 703. Also, filter 1275 may be part of lens 703 such as a coating or a multilayer of coatings disposed on a surface of lens 703. Further, filter 1275 can be formed as a component or composition of lens 703, such as by including radiation absorbing and/or reflecting materials into the construction and/or composition of lens 703 in order to form a filtering lens. As shown in FIG. 13, lens 703 is coupled to filter 1275 via connector 1262. Filter 1275 is coupled to thermal sensor 102. Thermal sensor 102 is coupled to control module 410 via interconnector 1252.

Filter 1275 may also be an integral part of the mechanical assembly constituting sensor 102.

The spectral bandpass of filter 1275 along with the spectral bandpass of lens 703 is chosen so as to facilitate transmission of infrared radiation in a spectral bandwidth useful for pyrodetection of movement of a human body in a closed trunk compartment, but with a reduced transmission of incident radiation at wavelengths outside the wavelengths that carry the majority of radiation emitted by a living person.

The majority of the spectral output of a human body at 98.6 degrees Fahrenheit typically has a range between about 3 and 14 microns and peaks around 9.3 microns. Preferably, the spectral bandpass of the optical element such as filter 1275 and/or lens 703 is configured to be highly transmitting to the spectral signature generated by a human, and to reduce transmission of, or block, wavelengths outside this human characteristic signature so as to reduce the possibility of false triggers of vehicle compartment occupancy detection system such as the heating or cooling of walls of the compartment or thermal draughts caused by heated or cooled air movement in the compartment.

Also, the bandpass of the optical elements such as filter 1275 and/or lens 703 is preferably configured to optimize the spectral sensitivity of thermal detector 102. Filtering can be by absorbtive filtering and/or by reflective filtering. Typically, such filtering has a radiation transmission bandpass higher than about 8 microns and lower than about 14 microns; preferably between about 8.5 microns and 12 microns. Outside these spectral ranges, filter 1275 and/or lens 703 is substantially non-transmitting so as to restrict the wavelengths of radiation incident on thermal sensor 102 to those characteristic of a trapped occupant. Humans may also be detected at about a 3–5 micron range.

Thermal detector 102 is preferably a dual-element detector, preferably comprising two pyroelectric elements disposed side by side. One of the two pyro-elements is preferably electrically poled opposite to the other, and the elements are thermally isolated from one another. Both elements are typically established, coplanar, on a common substrate.

It is also an embodiment to place any suitable number of elements in parallel opposed format (i.e. 2, 4, 6, etc.). Such a configuration would increase sensitivity and decrease the likelihood of false-alarms.

Lens 703 preferably has a field of view and focal length selected to optimize detection of a child trapped within a closed automobile trunk compartment while minimizing the occurrence of system false triggers due to non-human generated thermal differentials. While the specific selection will vary from one vehicle trunk configuration to another, in general it is preferred that lens 703 have a field of view of at least about 40 degrees, more preferably at least about 70 degrees, most preferably at least about 100 degrees. In general, the objective of the system optics is to provide comprehensive monitoring of the trunk compartment volume while obviating potential contributors to errant thermal signals such as from the heated or cooled walls of the trunk compartment.

It is also an embodiment to incorporate reflectors fabricated of, for example aluminum, gold or other suitable material, as known by those skilled in the art. Such reflectors increase the field of view for each sensor. This is desirable for interior applications.

Lens 703 may comprise a single lens element or multiple lens elements, and may comprise a diffractive optical element and/or a refractive optical element. Preferably, lens 703 comprises a wide angle lens and more preferably, lens 703 comprises a plurality of lenslets arranged substantially hemispherically in front of thermal sensor 102. In such an arrangement of multiple lenslets formed as a canopy over thermal sensor 102, any two lenslets can be viewing two spaced but closely adjacent locations within the interior volume of a closed vehicle trunk. Differentials in thermal characteristic between the two locations is thus sensed by the optics and dual-element pyrodetector of the vehicle occupancy detection assembly 513, and the presence of a child or equivalent body in the trunk compartment can be determined. By selecting the field of view and focal length of the individual lenslets, the internal volume of the trunk compartment can be preferentially monitored (a child will move in this volume) while minimizing thermal imaging of walls, floor panels and other portions of the compartment that potentially could contribute spurious thermal signatures leading to a false trigger event.

Figure 14B:
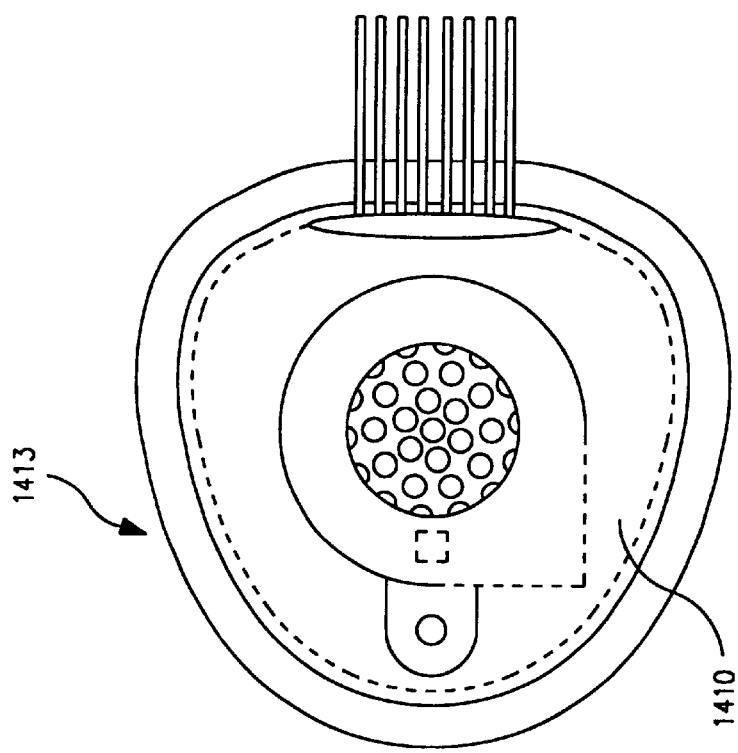
FIGS. 14A and 14B show views of the detector module.
Figure 14A:
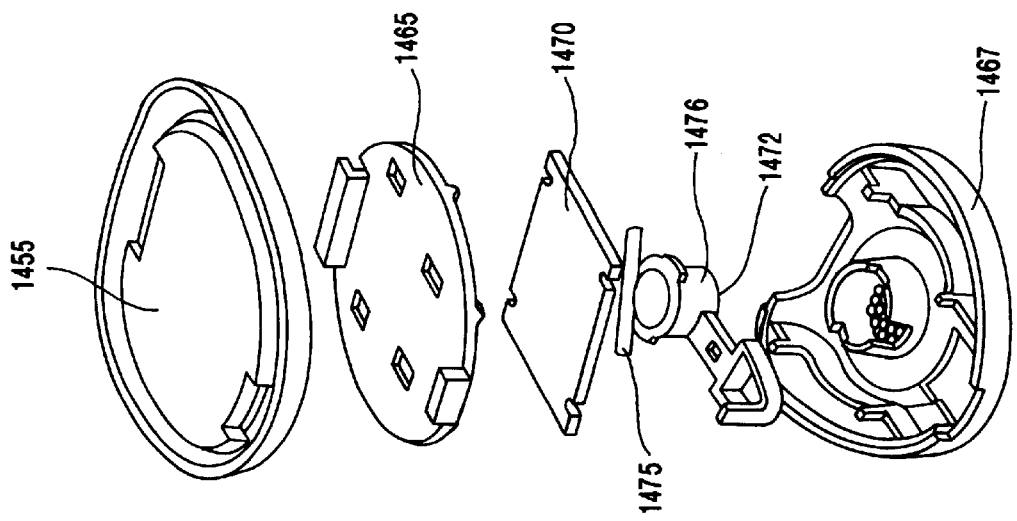

FIGS. 14(A) and 14(B) show two views of PTRS detection unitary module 1413. An exploded view is shown in FIG. 14(A) and a perspective view is shown in FIG. 14(B). The components attach to an adapter plate or mount 1455 that secures to an inner surface of a vehicle trunk compartment, such as to a sheet metal section. Mount 1455 can attach by an adhesive, such as an adhesive strip, or by mechanical attachment such as by screws, bolts, fasteners or snaps. A backplate 1465 attaches to mount 1455, preferably in a detachable fashion via fasteners or snaps so that the PTRS detection module 1413 is removable for replacement or service. Trunk constructions, and their interior surfaces, sizes and dimensions, vary from one vehicle model to another. A mount 1455 permits the detection module 1413 to be mounted in a variety of locations.

The arrangement as illustrated in FIGS. 14(A) and 14(B) shows that the mount 1455 can be customized for a particular vehicle model, but a standard and universally usable PTRS unitary detection module 1413 can be fabricated, and used in a wide variety of vehicle models by attaching to the customized mounting plate 1455 in a particular model. PTRS unitary detection module 1413 includes a housing 1467 that accommodates a printed circuit board 1470, which typically includes a thermal sensor and circuitry for a controller, as shown in FIG. 3, a lens 1472, a filter 1475, connectors and sockets for electrical inputs and outputs and a user-operatable button 1476 for deactivating the PTRS unitary detection module 1413, if desired, and/or for performing a system self-test function in order to verify that the module 1413 is functional. Button 1476 is preferably backlit by a light source to aid visibility, especially at night, for example by a light emitting diode. Preferably, lens 1472 is positioned in a crater formed by side-walls of housing 1467 so that the lens 1472, and the thermal sensor disposed therebehind, is protected by the walls of housing 1467 from damage by objects stored or placed in the trunk. Also, by disposing the lens 1472 in a well formed by the walls of housing 1467, the field of view of lens 1472 can be restricted, and the lens/thermal sensor in the module 1413 can be protected from spurious thermal draughts.

Optionally, housing 1467 can disconnect from backplate 1465 to allow service access to the thermal sensor and/or circuitry of the controller. Alternately, housing 1467 and backplate 1465 can be sealed so that the PTRS detection module 1413 is sealed against water, dust, dirt and other debris.

Figure 15:
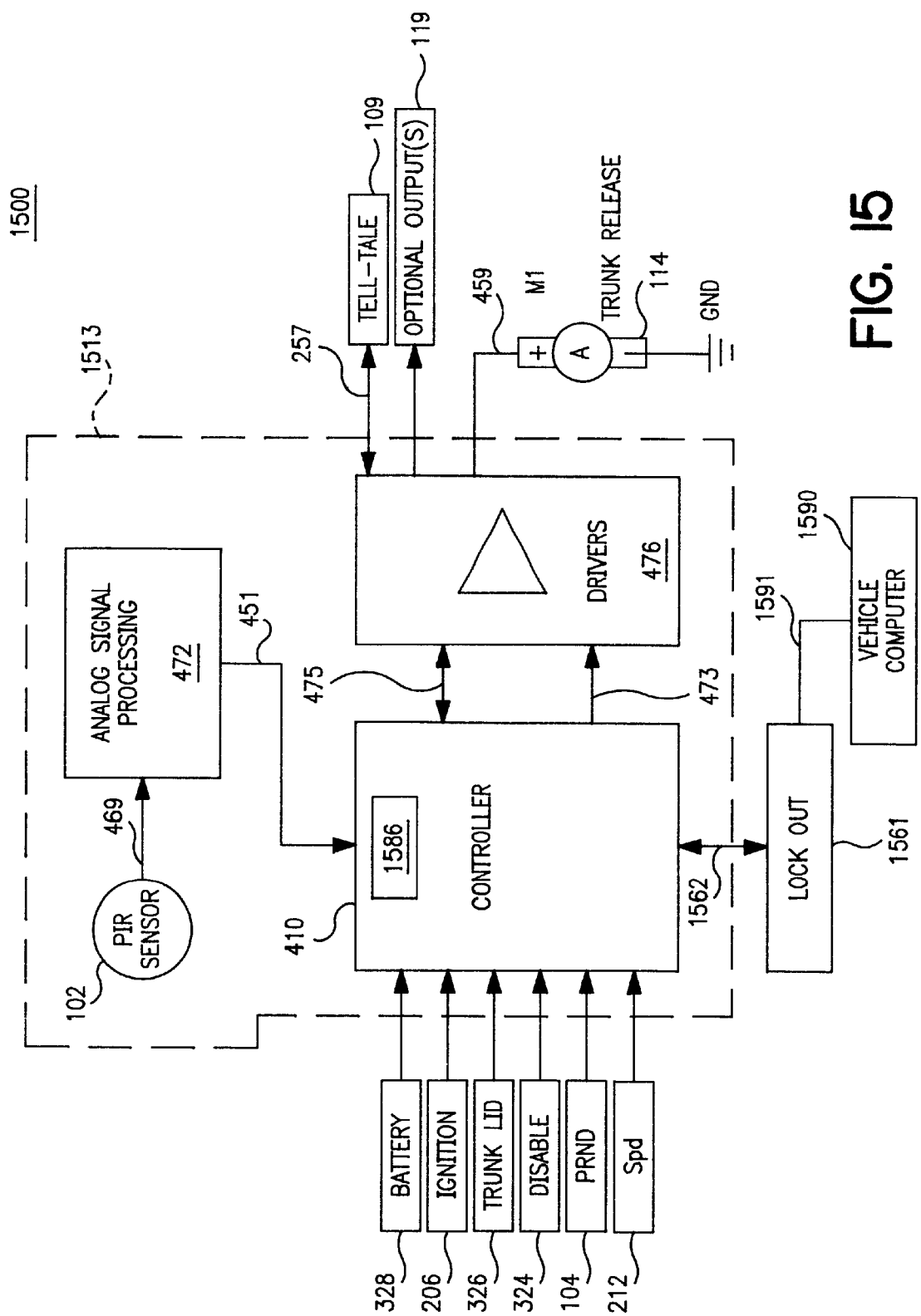
FIG. 15 detector module used with a lock-out module.

FIG. 15 shows system 1500 including detection device 1513, input modules and output modules. Detection device 1513 includes a sensor 102, analog signal processor 472, controller 410 and drivers 476. Sensor 102 generates an alert signal and this signal is processed by analog signal processor 472. Controller 410 includes a microcontroller 1586, preferably based on a microprocessor or microcomputer. Controller 410 receives the processed alert signal from analog signal processor 472 via interconnector 451.

Detection device 1513 receives various inputs. An input 328 provides vehicle battery power (typical 12 volts DC, although higher battery voltages such as 42 volts are contemplated for use automobiles) to detection device 1513. Ignition input 206 provides input from the vehicle ignition system should it be desired to operate the vehicle occupancy detection system while the vehicle engine is operating. Ignition input 206 also provides a signal regarding the status of the engine. Trunk lid input 326 provides a signal from the trunk lid indicative of whether the trunk lid is open or not. For example, a proximity switch such as a Hall probe or a spring-loaded closure switch is suitably provided on the trunk lid. If the trunk lid closure switch 326 indicates that the trunk lid is open, then an input is provided to detection device 1513 that will disable its operation. This is useful when the vehicle is parked whereupon the PTRS module 1512 circuitry would be automatically activated and when the trunk lid is purposely opened by the vehicle owner to access the trunk. Upon opening the lid, the detection device 1513 circuitry is automatically disabled, thus obviating inappropriate and unneeded repetitive. actuation of the trunk release mechanism 1144 by the detection device 1513 as the driver reaches into the trunk cavity to place or retrieve objects.

Detection device 1513 is connected to a lockout module 1561 via bidirectional interconnector 1562. Lockout module 1561 prevents inadvertent actuation of the trunk occupancy detection system 1500 while the vehicle is in an operating state, such as driving on a highway, or when the engine is idling in traffic or idling when stopped at road-side. An example of a lockout circuit is disclosed in U.S. Pat. Nos. 5,371,659 and 5,669,704, both of which are hereby incorporated by reference in their entirety herein. Lockout circuit 1561 is responsive to the vehicle transmission being placed in gear via PRNDL module 104 as well as responsive to a sensor sensing the speed of the vehicle via speedometer module 212. The lockout circuit 1561 may also be included in the vehicle ignition system such that the detection device 1513 is disabled when the engine is started and the vehicle is operating. Thus, the trunk release 114 and/or trunk occupancy detection device 1513 will be disabled when the ignition switch is turned to "start".

A lockout input is transmitted from a lockout circuit 1561 to detection device 1513 via bidirectional interconnector 1562 and disables actuation of a trunk release signal and/or generation of a trunk occupancy control signal by the detection device 1513. The lockout module 1561 provides output via interconnector 1562 by sensing when the vehicle ignition key is turned on, or other starter mechanism, to "ignition on" and starting the engine, or by placing the gear lever of the vehicle out of "PARK" gear, or by sensing motion of the vehicle using an accelerometer (preferably, an accelerometer, most preferably a solid-state accelerometer, packaged in the detection device 1513 such as within the housing (not shown in FIG. 15). The lockout module 1561 also suitably receives an input from a vehicle computer 1590, via interconnector 1591, indicating that the engine is operating, or receiving an input from a speedometer system, or setting the ignition system to "accessory on" status, or a speed or motion detection system, and detecting that the vehicle is exceeding a predetermined minimum speed (such as 5 miles per hour).

Provision of a lockout signal 1562 prevents trunk release mechanism 114 from actuating when the vehicle engine is operating or when the vehicle is powered and moving. The lockout module 1561 is part of the vehicle compartment occupancy detection system as shown in FIG. 15, and is beneficial in avoiding the possibility of false triggers, and undesired and unneeded release of the trunk lid under control of the detection device 1513 while the vehicle is in motion on the highway, or when stalled, or operating in traffic, or when stopped but with the engine running.

The detection device 1513 is provided with a user-operatable button (button not shown in FIG. 15) that actuates a switch/disable input 324 to controller 1587 that can disable operation of the vehicle compartment occupant detection system 1500 should it be so desired in a particular circumstance. Examples of this include when the vehicle is being serviced. However, deactivation of the system 1500 in response to user-actuation of such an input 324 is preferably and desirably disabled whenever the trunk lid is closed and the vehicle is not operating under engine power. Thus, user-operation of such a button on the detection device 1513 by a child trapped in a closed trunk compartment will not disable automatic release of the trunk latch 114 and opening of the trunk lid under control of the detection device 1513.

Figure 16:
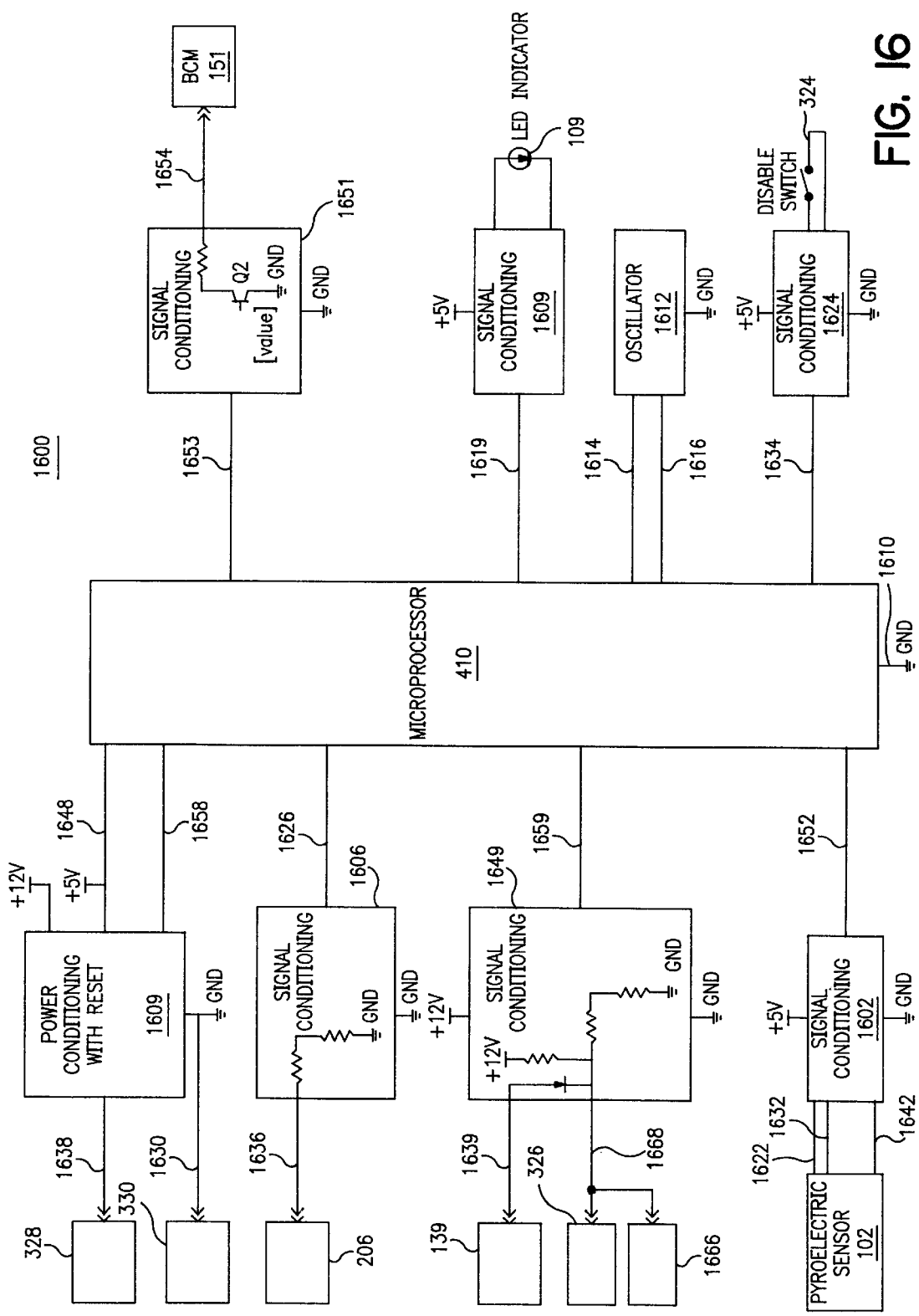
FIG. 16 shows a block diagram of a detection system.

FIG. 16 shows a block circuit diagram of system 1600. The diagram shows in greater detail the components discussed herein.

Battery module 328 and ground module 330 are coupled to power conditioning with reset circuit 1628 via interconnectors 1638 and 1630, respectively. Power conditioning with reset circuit 1628 is coupled to processor 410, via interconnectors 1648 and 1658.

Ignition module 206 is coupled to signal conditioning circuit 1606 via interconnector 1636. Signal conditioning circuit 1606 is coupled to processor 410 via interconnector 1626.

Trunk lamp 139 is coupled to signal conditioning circuit 1649 via interconnector 1639. Compartment lid modules 326 and 1666 are coupled to signal conditioning circuit 1649 via interconnector 1668. Signal conditioning circuit 1649 is coupled to processor 410 via interconnector 1659.

Sensor 102 is coupled to signal conditioning circuit 1602 via interconnectors 1622, 1632, and 1642. Signal conditioning circuit 1602 is coupled to processor 410 via interconnector 1652.

Processor 410 is coupled to signal conditioning circuit 1651 via interconnector 1653. Signal conditioning circuit 1651 is connected to body control module (BCM) 151 via interconnector 1654.

Processor 410 is coupled to signal conditioning circuit 1609 via inter connector 1619. The output from signal conditioning circuit 1609 is received by LED indicator 109.

Processor 410 is coupled to an oscillator 1612 via interconnectors 1614 and 1616.

Processor 410 is coupled to signal conditioning circuit 1624 via interconnector 1634. Signal conditioning circuit 1624 is coupled to disable switch 324.

Figure 17A:
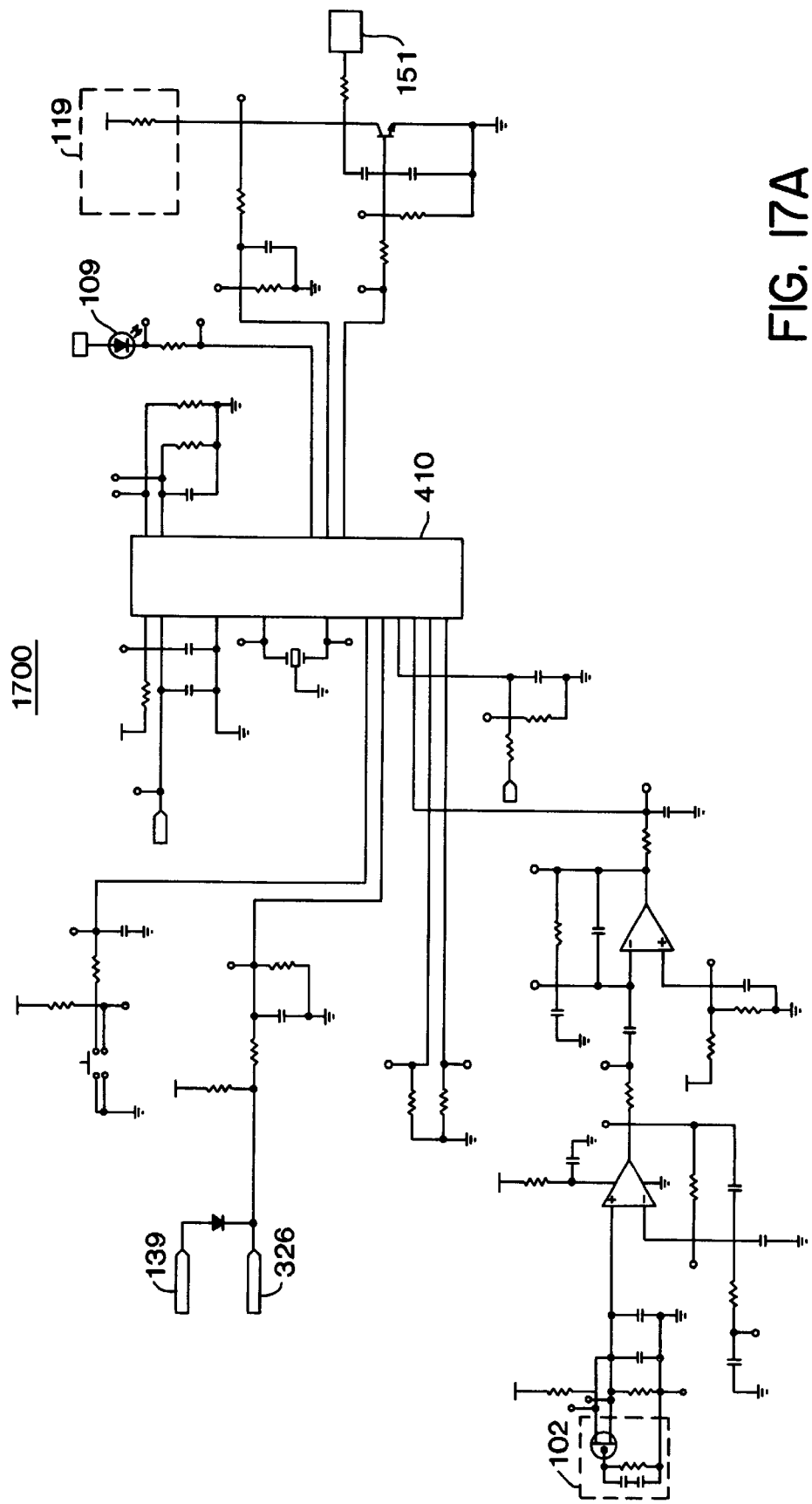
FIGS. 17(a)–(c) show a schematic diagram of the detection system.
Figure 17B:
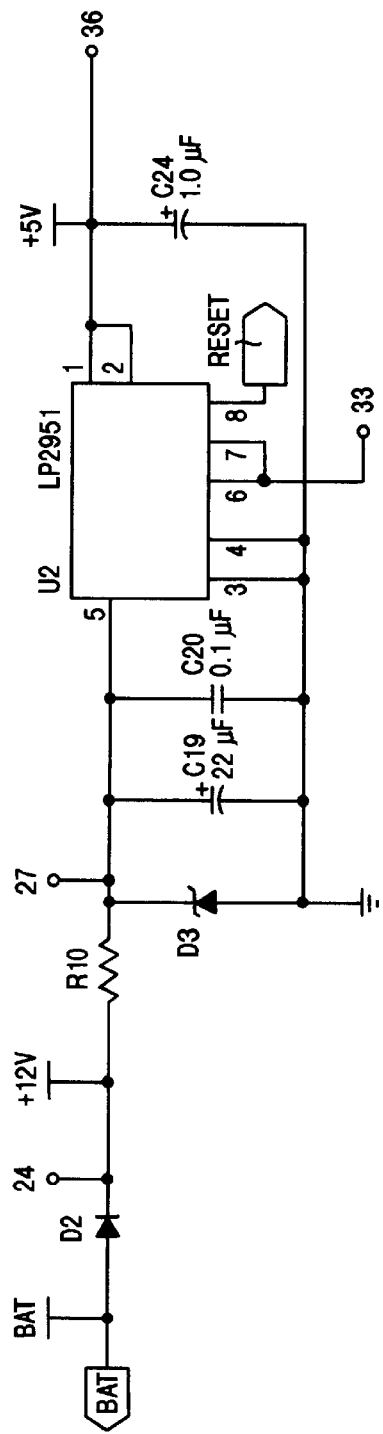
Figure 17C:
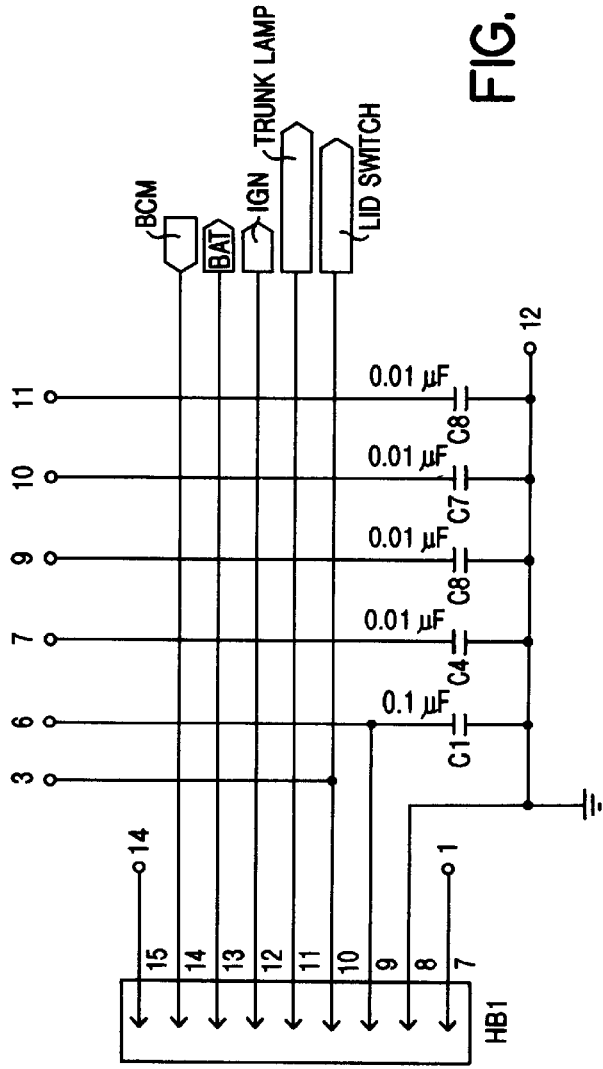

FIG. 17 is a schematic diagram of the detection system 1700. The connections described above are shown in greater detail in FIG. 17. For example, trunk lamp 139, lid switch 306 and sensor 102 are coupled to processor 410. The processor 410 is coupled to LED 109 and BCM module 151. The connection from processor 410 to optional outputs 119, as discussed above, are also shown.

Referring back to FIG. 12, the vehicle occupancy detection system 1100 preferably incorporates various means to reduce the occurrence of false triggers that could cause release of a trunk lid by phenomena other than detection of a person or pet trapped in a closed vehicle compartment such as a trunk compartment. Such unnecessary and inappropriate false triggering of a trunk lid, can possibly cause inconvenience, security concerns and potential safety concerns. Thus, the vehicle occupancy detection system 1100 suitably includes one or more false trigger reduction means to reduce and/or substantially eliminate the occurrence of unwarranted opening a trunk lid by false triggering of the vehicle occupancy detection system.

Examples of vehicle occupancy detection system false trigger protection include mechanical vehicle occupancy detection system false trigger protection, thermal isolation vehicle occupancy detection system false trigger protection, filtering vehicle occupancy detection system false trigger protection, electrical/electronic vehicle occupancy detection system false trigger protection, optical vehicle occupancy detection system false trigger protection, analog vehicle occupancy detection system false trigger protection, digital vehicle occupancy detection system false trigger protection, computational vehicle occupancy detection system false trigger protection, mathematical vehicle occupancy detection system false trigger protection, algorithmic vehicle occupancy detection system false trigger protection and secondary vehicle occupancy detection system false trigger protection.

Mechanical vehicle occupancy detection system false trigger protection includes for example, placement of a PTRS module on a vehicle trunk wall portion, or preferably a vehicle trunk roof portion such as under a parcel shelf of the rear window region of the interior vehicular cabin, so as to be protected/insulated from heating/cooling effects of the vehicle sheet body metal or other vehicle components and not readily subject to impact from mechanical objects being placed into the trunk, being removed from the trunk, or moving about in the trunk. Mechanical vehicle occupancy detection system false trigger protection means also include recessing the lens (and thermal sensor therebehind) in a well or trough formed by the walls or other structures of the housing of PTRS module. Placing the thermal detector/lens in a crater formed by such walls provides protection from mechanical impact for the lens that could potentially initiate a false trigger and the walls provide mechanical protection against thermal draughts and other thermal abnormalities.

Thermal isolation vehicle occupancy detection system false trigger protection means include thermally isolating thermal the sensor (shown as element 102 in FIG. 13) and the lens (shown as element 703 in FIG. 13) from the heating and cooling of the vehicular body, such as the vehicular sheet metal, by mounting, in a housing that attaches, such as shown in FIG. 14, to an inner surface of a trunk compartment, but with the lens/thermal sensor, spaced from, and thermally isolated from the attachment point and thus from the vehicle body. Housing 1467 shown in FIG. 14(A) preferably provides a substantially isothermal thermal cage for thermal sensor shown in FIG. 13 as element 102.

Figure 18:
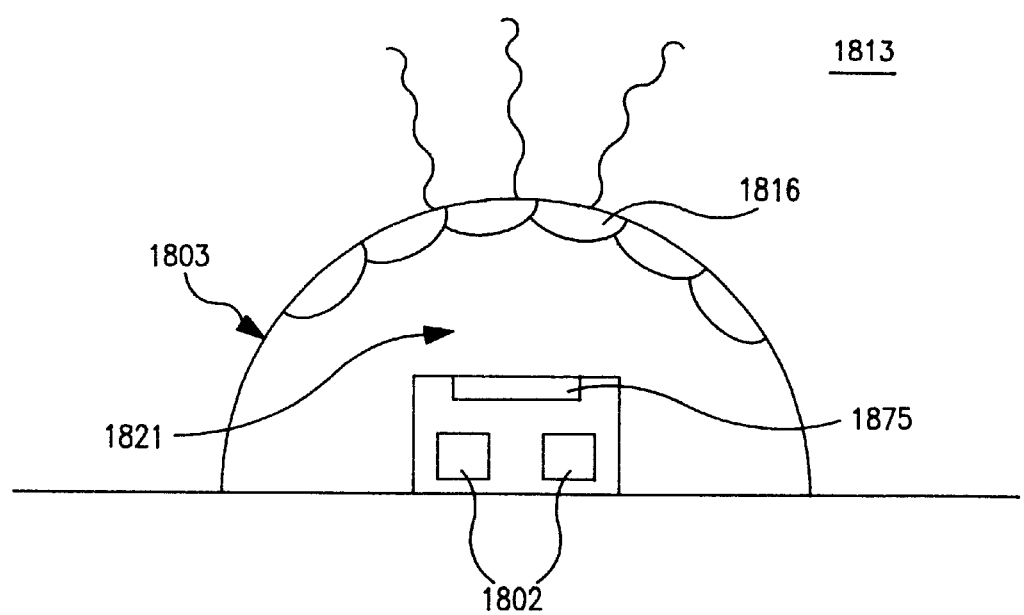
FIG. 18 shows a detector device with an air bubble.

FIG. 18 shows a detector device 1813 with a sensor 1802 a filter 1875, a lens surface 1803 and an air gap 1821. The air gap 1821 is a pocket of air between the lens surface 1803 and the filter 1875 that prevents a rapid change of temperature experienced by the sensor 1802.

Filtering vehicle occupancy detection system false trigger protection means include optical filtering and electrical or electronic or computational or mathematical or algorithmic or analog or digital filtering.

Optical filtering encompasses restricting the bandwidth of radiation incident on the thermal sensor to a spectral bandwidth emitted by a living body (typically from approximately 8 microns to 14 microns of the electromagnetic radiation spectrum). Since a living body will be at a relatively narrow temperature range for example, a human is typically 98.6 Fahrenheit but in cases of hypothermia or hyperthermia, potentially a slight variation of typically one to three degrees Fahrenheit. Use of infrared filters to reject radiation of spectral wavelength outside those wavelengths emitted by a living body reduces false triggers from movement or changes in temperature of heated or cooled vehicle body panels or compartment walls, and from movement or changes in temperature of objects in the vehicle, such as groceries loaded into a trunk compartment, trunk compartment local hot and cool spots, which phenomena are likely to have an emittance spectrum different from that of a human body, and thus be filtered by the filter absorbers and/or reflectors provided by filter 1275 and/or lens 703 shown in FIG. 13).

Optical vehicle occupancy detection system false trigger protection means include selection of a lens structure, field of view and/or focal length that provides wide and adequate monitoring of a vehicular compartment, and particularly of any region in a vehicular trunk compartment where a frightened child might be located while reducing thermal imaging of regions and parts of the compartment, (such as vehicle body walls) more likely to contribute thermal signatures that could confuse and/or hinder determination of a true occupant presence signal by the controller.

Filtering, such as electrical or electronic or computational or mathematical or algorithmic or analog or digital filtering reduces false triggers and encompasses analysis by the controller of the signal output of a thermal sensor to determine a signal component frequency and/or amplitude that is indicative of movement of a living body within a vehicle compartment. This signal component frequency is distinct from other signal components in the output of a thermal sensor that are at signal frequencies and/or amplitudes that are different from the signal frequency and/or amplitude characteristic of a living body. For example, a child moving within a closed trunk compartment will create a thermal differential signal as detected by a thermal sensor that will be typically at a frequency of at least about 0.15 to 10 Hertz whereas a grocery bag with frozen grocery items that are thawing or heated items that are cooling, will change its thermal signature at a rate different than the rate of thermal change created by a moving person in the compartment. The living person indicative thermal signal can be isolated and/or enhanced for example by analog signal processing; digital signal processing; signal enhancement or filtering by computer algorithms, by mathematical signal processing and by similar techniques.

Additionally, bandpass filters can be adjusted to avoid the vehicle frequency. This will reduce false alarms while still being sensitive to human movement. Inanimate objects are subject to the resonant frequency of each vehicle. Thus, a notch filter could be used that is adjusted to each vehicle.

Electrical or electronic vehicle occupancy detection system false trigger protection includes signal averaging, signal accumulation, signal verification and signal enhancement by analog, digital and mathematical and/or algorithmic and/or computational techniques. For example, controller can await detection of a confirmatory trapped occupant indicative signal or a plurality of trapped occupant indicative signals (such as, for example, confirmation of receipt of a minimum number of "viable" signals, for example at least three "viable" signals, in a determined time interval, for example 5 seconds or longer) before the controller generates an output signal to a trunk latch mechanism to open a trunk lid.

The controller can include pre-stored signal profiles indicative of "viable" signals that would be attributable to a trapped occupant and false signals attributable to non-occupation signals, such as for example heating or cooling grocery bags or items falling over in a trunk, would be attributable to trunk body heating and cooling. Actual signals being processed by the controller can be compared, such as by computational comparison, to stored signals in order to determine a true occupant detection signal and to reduce the incidence of false triggers.

A learning function can be included in the controller whereby the controller learns the normal thermal signatures experienced in a vehicle trunk used throughout the four climatic seasons in a variety of geographic locations. The presence of a trapped occupant is a rare event, and so the vehicle occupancy detection system, having learned what is normal for that particular compartment in that particular vehicle, will more readily recognize and react to the signal signature of a trapped living person or pet. Thus, a dynamic vehicle compartment occupant detection false trigger reduction system is provided that is adaptive to the thermal conditions experienced in a particular vehicular compartment, such as the trunk of a particular automobile.

An alternative form of a dynamic vehicle compartment occupant detection false trigger reduction system comprises providing an input to the controller that is indicative of the outside and/or compartment temperature. For example, a temperature sensor such as a thermocouple or thermistor can be included in the PTRS module in order to detect the air temperature in the compartment. Alternately, a temperature input can be provided from another location in the vehicle, such as via a car area network (also referred to as controlled area network), that provides information to the controller as to the outside temperature, the interior cabin temperature and/or the vehicle compartment temperature. The controller can determine, for example, the difference between the temperature of the trunk compartment and that expected of a human body (about 98.6 degrees Fahrenheit). If the magnitude of the temperature difference is substantial such as may occur when a trapped event occurs in a cold climate where the trunk interior will be cold relative to body temperature or such as may occur when the trapped event occurs in a hot climate where the trunk interior will be hot relative to body temperature, the sensitivity and reaction of the controller can be set accordingly. However, should the air temperature of the trunk compartment be very close to or equal to the body temperature of the body trapped therein, then detection of body presence by detection of the differential in temperature between that body and the trunk compartment is more challenging as that differential may, in such circumstance, be only a fraction of a degree Fahrenheit such as 0.5 degrees Fahrenheit, or smaller.

The temperature, and hence thermal emission signature, of a living body such as a human body is not the same over the entire body and can vary, for example, from the face to a hand or a leg, or even from one part of a leg to another part of a leg. Clothes may also have a different emissivity temperature compared to exposed body parts such as a head or a hand. Temperature differences can be small, lower than about 1 degree Fahrenheit, and for example, less than about 0.1 degrees Fahrenheit. Thus, when the temperature of the vehicular compartment is close to or at body temperature, the sensitivity of vehicle compartment occupancy detection system is desirably high so that it is sensitive to detecting small changes in temperature, and preferably is at a thermal differential sensitivity of about 5 degrees Fahrenheit or lower, more preferably at a thermal differential sensitivity of about 1 degree Fahrenheit or lower, most preferably at a thermal differential sensitivity of about 0.5 degrees Fahrenheit or lower. The thermal differential sensitivity of the vehicle compartment occupancy detection system can be set so that it reacts to release of a trunk latch only when a pre-determined temperature differential is detected such as for example, triggering of a latch release when a temperature differential of about 10 degrees Fahrenheit or less is detected or, for a more sensitive system, triggering of a latch release when a temperature differential of about 5 degrees Fahrenheit or less is detected, or for an even more sensitive system, triggering of a latch release when a temperature differential of about 1 degree Fahrenheit or less is detected, or for a very sensitive system, triggering of a latch release when a temperature differential of about 0.5 degrees Fahrenheit or less is detected.

Alternatively, instead of providing a fixed thermal differential sensitivity for the vehicle compartment occupancy detection system, a dynamic thermal differential sensitivity can be provided for the vehicle compartment occupancy detection system. This includes, for example, an algorithmic vehicle occupancy detection system false trigger protection system or a mathematical vehicle occupancy detection system false trigger protection system or a computational vehicle occupancy detection system false trigger protection system or an analog and/or digital electronic vehicle occupancy detection system false trigger protection system. These dynamically change the thermal differential sensitivity for the vehicle compartment occupancy detection system, and other characteristics of the controller, in response to actual inputs to the controller in response to the occurrence of a given event in a particular vehicle compartment. Thus, for example, should a temperature input to the controller indicate that the ambient temperature in the compartment is close to or equal to body temperature, then a higher thermal sensitivity can be selected by the controller for example, a thermal differential sensitivity of about 1 degree Fahrenheit may be chosen, preferably in conjunction with another false trigger reduction means such as utilization of a more stringent "viable" signal verification routine that requires a higher number of event detection signals in a pre-determined time period or a longer duration can be chosen before an output to release a latch is given to raise a trunk lid.

The false trigger protection and/or reduction system of the vehicle compartment occupancy detection system may also include analog and/or digital circuitry that assists in distinguishing an occupant thermal signature from other non-occupant indicating signals detected by a thermal sensor. For example, use of an electrical lockout circuit, as described above, ensures that a false trigger event cannot occur while the vehicle is operating. Also, the false trigger protection and/or reduction system of the vehicle compartment occupancy detection system may include secondary vehicle occupancy detection system false trigger protection means.

For example, a microphone may be provided as part of PTRS module or may be mounted elsewhere in the vehicular compartment for use in conjunction with thermal sensor and as part of the vehicle compartment occupancy detection system. The microphone is suitably positioned to detect sounds within the closed compartment. The output of the microphone is processed by the controller to distinguish human vocal sounds and also suitably pet sounds from other non-occupant sounds in a vehicle. The controller distinguishes a vocal signal from ambient noise by analog and/or digital filtering that is configured to identify that a person is shouting or screaming in the compartment. Techniques such as digital sound processing can be used to enhance the vocal signal to background noise ratio, as described in U.S. patent application Ser. No.: 09/449,121, filed Nov. 24, 1999, titled "Rearview Mirror Assembly With Utility Functions" by Hutzel et al. of Donnelly Corporation (Attorney Docket: P-778), the entire disclosure of which is hereby incorporated by reference herein.

An audio system such as a sound processing system used in conjunction with a pyrodetector can be used to distinguish human (or pet) made sounds or frequencies or patterns from other sounds audible in the trunk of a vehicle, such as outside traffic noise, the sound of a grocery bag falling over, loose objects rolling or moving on a trunk floor. The microphone described above as element 144 in FIGS. 1 and 3, or vocal sound detection system can augment the pyrodetection system and provide a confirmation that a person is present in the closed trunk.

Alternately, the audio system provided in the trunk or other closed vehicular compartment such as the interior cabin space can serve as a primary occupant detection device, such that a trunk lid will release when a microphone or audio processing system determines the presence of a human voice in a closed compartment. Additional occupant detectors are suitably used to augment the thermal sensor in order to reduce false trigger events, or alternatively replace the thermal sensor as the system occupant detector and serve as a stand-alone occupant detector, or serve as the primary occupant detector and with a pyrodetector to augment it in order to reduce false trigger occurrences. Other sensing mechanisms, include bolometers, camera systems such as CCD or CMOS-based digital camera systems, ultrasonic detection systems, and radar detection systems.

Where camera systems are used, it is desirable to use an in-trunk compartment illumination means to light-up the closed compartment for viewing by the camera. For example, a trunk light described as element 139 in FIGS. 1 and 3 above, can illuminate thereby allowing the camera to capture an image of the trunk interior. Since such interior lights typically consume significant electrical current, it is preferred that this illumination be a momentary illumination for a brief period for example, between 1 and 5 seconds or shorter, depending on the exposure needs of the camera and the rate of illumination of the light source so as to conserve battery power. It is preferable to use non-incandescent, low-power, solid-state light sources such a light emitting diodes such as are described in U.S. patent application Ser. No.: 09/449,121, filed Nov. 24, 1999, titled "Rearview Mirror Assembly With Utility Functions" by Hutzel et al. of Donnelly Corporation (Attorney Docket: P-778), the entire disclosure of which is hereby incorporated by reference herein. As described above in FIG. 2 above, The PTRS module, which typically is a very low current device, can be constantly monitoring the trunk space while the vehicle is parked. If the PTRS module suspects the presence of a trapped occupant, then optionally an additional trunk space monitoring device (such as a microphone or a camera or the like) is activated by the PTRS module to perform a confirmation of occupant presence.

Since the vehicle compartment occupancy detection system will operate while the vehicle is parked, it is desirable that vehicle battery drain be minimized. Preferably, for the 12 volt battery vehicles commonly used, the desired current drain for the vehicle compartment occupancy detection system (including the thermal sensor and any associated electronic circuitry) is less than about 10 milliamps, preferred is less than about 5 milliamps, more preferred is less than about 1 milliamp, and most preferred is less than about 0.5 milliamps. A low-current pyrodetection system, suitable for automobile compartment use while a vehicle is parked, is disclosed in U.S. patent application Ser. No.: 08/901,929, filed Jul. 29, 1997, titled "Automotive Pyroelectric Intrusion Detection System" by Teowee et al. of Donnelly Corporation the entire disclosure of which is hereby incorporated by reference herein.

The PTRS module, when used with vehicles with a higher battery voltage such as 42 volts, the current drain may be 0.1 milliamps, or lower. Since, even the smallest current draw by the vehicle compartment occupant detection system will eventually drain the vehicle battery if the vehicle is parked long enough and other vehicular accessories such as security systems, keyless entry systems and the like may drain the battery of a parked vehicle even before any such drain by the vehicle compartment occupant detection system. Thus, the vehicle compartment occupant detection system suitably includes a vehicle low battery detect and/or response system. This low battery detection is activated by an input from the vehicle battery, shown as element 328 in FIG. 4 above. Input from the battery module (328) causes the PTRS module to generate an output to an indicator indicating a low battery situation.

The vehicle compartment occupant detection system such as the passive trunk release system described herein is used in conjunction with an active trunk release system such as the manually-operated trunk release handle disclosed in U.S. patent application Ser. No.: 09/275,565, filed Mar. 24, 1999, titled "Safety Handle For Trunk of Vehicles" by Bingle et al. of Donnelly Corporation, the entire disclosure of which is hereby incorporated by reference herein.

Providing both an active and a passive occupant escape system in the same trunk further enhances compartment safety. Also, not all vehicle trunks are provided with a powered (typically by an electrically actuated solenoid-or the like) trunk release latch, and in such vehicles, provision of an active trunk release such as by pulling a lever, handle or other release mechanism located in the trunk space is necessary to allow trunk escape. Also, active trunk release systems such as the manually-operated trunk release handle disclosed in the above-referenced patent application, preferably have lighted handles or the like that illuminates for a period after the trunk lid is initially closed following a trunk closure (but ceases to illuminate after a time-out period in order to conserve battery power). This lighted handle is re-illuminated should it be touched or pulled in order to aid and encourage a child or similar trapped occupant to pull the handle to release the trunk lid and escape. When such a lighted safety handle is used in conjunction with a vehicle compartment occupancy detection system, the PTRS module, upon detection of person movement within the trunk space, can provide an output as discussed herein that illuminates the user-operable manual trunk lid release handle or other device provided in the trunk compartment. When the manual trunk handle light is not inclusive of light sources for self-illumination, then the output may illuminate a trunk space light provided in the trunk space compartment, which is preferably, a special purpose light source such as a single or a cluster of high intensity, directed, low-current, non-incandescent compact light emitting diodes or a electroluminescent strip which are suitably mounted as part of PTRS module.

Alternately, the trunk light is suitably, incandescent, which is commonly provided to illuminate trunk spaces.

Preferably, such lights, once initiated to illuminate by the PTRS module, cease to illuminate after a timed out period for example 30 to 60 minutes or even longer. Also, preferably, the controller includes circuitry, to monitor the state of charge of the vehicle battery. As the vehicle battery runs down, its output voltage declines. Once the controller determines that the state of charge of the vehicle battery has declined to a point close to it not having sufficient charge to power a trunk release latch and so open a trunk lid, the PTRS module can optionally provide a trunk release output to the trunk lid release latch and cause the trunk to open before the battery drains beyond a point capable of powering a trunk release event. The PTRS module also disables the trunk latch from allowing the trunk lid to engage closed again. Although the trunk will then be open presenting a potential theft opportunity, the vehicle is safe against children being trapped in the trunk. Given that such an event only normally occurs when a vehicle is parked or abandoned for an unusually long extended period, child safety concerns may warrant having the trunk lid open to a child-safe open position should the battery drain over time. Further, if desired, an auxiliary battery source for the occupant escape system, such as by provision of a back-up battery, preferably rechargeable via a vehicle exterior mounted solar panel, can be utilized.

Further, the PTRS module and/or the handle of any active manually actuatable trunk release handle can include a simulated or recorded voice generator, that outputs a message (preferably a multilingual message such as "Please stay calm" or "Please push the lid up" or "Please pull the handle to escape" that encourages, calms and instructs a trapped occupant. Preferably, a solid-state voice chip, such as is commonly used in toys is used. Such a voice-generation chip is useful with a stand-alone active trunk release handle, such as the system disclosed in U.S. patent application Ser. No.: 08/275,565, filed Mar. 24, 1999, titled "Safety Handle For Trunk of Vehicle" by Bingle et al. of Donnelly Corporation, the entire disclosure of which is hereby incorporated by reference herein.

Also, since the PTRS module is particularly installed to assist escape of children from closed trunk compartments, preferably any automatic, electrically-operated trunk lid release latch is adapted so that the trunk lid readily and visibly raises so that a child will realize that escape is possible by pushing, with minimum effort, the opened trunk lid.

The controller, as described above includes an output that provides a variety of driver/logic outputs to various devices and accessories. Trunk release output provides an output to release the trunk latch and open the trunk lid. The trunk release output is typically provided to a trunk release controller in the vehicle that normally is activated by the driver-or another interior cabin occupant actuating a trunk release button located such as in the glove compartment of the interior cabin. The vehicle trunk release controller typically powers a solenoid equipped trunk latch.

Alternately, the trunk release output can be provided to a vehicular computer that controls various vehicular functions, including release of the trunk latch (either by direct wire link or via a local area network in the vehicle.

Optionally, once the controller of PTRS module has determined that an occupant is present in the closed vehicular compartment, output of the trunk release signal may be delayed for a short pre-determined period, for example five minutes. In certain instance involving carjackings and kidnappings, persons have been locked into trunks of vehicles. In such circumstances, provision of a trunk release delay on the trunk release output is preferred to allow the victim of the crime be placed into the trunk but to delay automatic opening of the trunk by the vehicle compartment occupant detection system for a short period preferably longer than about 1 minute, more preferably longer than about 3 minutes, in order to allow time for the criminal to move away from the trunk and so enable the victim escape, once the trunk lid ultimately releases at the end of the duration of the trunk release delay, unnoticed by the criminal. However, the trunk release delay should not be so long in duration as to cause undue stress to a trapped occupant under more normal circumstances where criminal activity is not involved. Thus, the duration of trunk release delay should preferably be no longer than about 15 minutes and more preferably be no longer than about 10 minutes. A trunk release delay in the 2–8 minute range is most preferred.

Also, the controller can include a power driver that provides a powering current to the trunk release latch to cause it to release the trunk lid. Such direct powering of the trunk release from the PTRS module is particularly beneficial for aftermarket installations of a powered trunk release latch. The controller can also provide an output that sounds the vehicle horn and/or flashes the vehicle lights to signal that a person is trapped in the trunk. It is preferred that the horn be sounded and/or the vehicle exterior lights be flashed in a manner that is unique and distinguishing for trunk occupancy.

For example, detection by PTRS module of a person trapped in the trunk could case the horn to repetitively sound in the Morse code "SOS" pattern of three shorter duration horn soundings (each of equal short time duration) immediately followed by three distinctly longer duration horn soundings (again each of equal longer time duration) followed by three shorter duration horn soundings and so on and so on in order to audibly simulate, via the car horn, the "3 dot-3 dash-3 dot" Morse code for SOS, that is widely recognized as signaling an emergency event. Similarly, and preferably simultaneously with the sounding of the car horn, the vehicle exterior lights flash in a "3 short flash-3 long flash-3 short flash" repetition to signal an emergency event in response to detection by the PTRS module of an occupant trapped in the vehicle. This is of particular benefit when the trunk lid is not electrically releasable. The sounding of the horn pattern and/or flashing of the lights pattern can be customized depending on the country that the vehicle is used. For example, people in different countries may recognize different patterns as a distress signal. The actual signals output can be programmed to correspond to a recognized distress signal of various countries.

The vehicle compartment occupancy detection identifier signal should be chosen to be different and distinct from such as a theft/security/intrusion alarm horn sounding/lights flashing. When the presence of an occupant trapped in the trunk is determined by the PTRS module, the vehicle compartment occupancy detection system preferably causes the vehicle horn to sound and/or lights to flash in a manner that is recognizable as being different from such as a car alarm activating, and in a manner that the public at large can recognize as a trunk occupancy detection event. The Morse "SOS" pattern is a preferred vehicle compartment occupancy detection identifier signal that can alert that a person is trapped in a vehicular trunk or another vehicular compartment; however another distinctive tone, frequency and/or intensity pattern can be adopted as the vehicle compartment occupancy detection identifier signal.

The PTRS module may also have an output to an indicator light in the vehicle cabin. For example, once the ignition of the vehicle is turned on, PTRS module may initiate a self-check. If it be properly functioning, an indicator, such as a backlighted icon or an LED or the like, flashes for a short time period for example, 5 to 10 seconds to indicate to the operator that the PTRS module is capable of operating properly. If, however, the PTRS module is malfunctioning, the controller suitably provides an output to a vehicle occupancy detection system malfunction indicator which can illuminate in the vehicle cabin, visible to the operator, indicating a system malfunction. Placement of such indicator displays at or on the interior rearview mirror assembly is preferred, as looking at the rearview mirror is typically part of the driving task, and so a compartment occupancy system malfunction indication display, placed at or on the interior rearview mirror assembly, is readily visible to the operator. For example, an information display can be provided at the reflective element, at the bezel of the mirror case or attached to a mirror support or mount such as is disclosed in U.S. patent application Ser. No.: 09/396,179, filed Sep. 14, 1999, titled "Indication For Vehicle Accessory" by Deline et al. of Donnelly Corporation, the entire disclosure of which is hereby incorporated by reference herein. As an alternative to placing the indicator at the interior rearview mirror assembly, trunk occupancy detection indicators can be placed at or on either or both of the exterior rearview mirror assemblies. Other in-cabin locations are also possible, such as in the dash or in an overhead console.

The controller also suitably provides an output to a vehicular wireless transmitter such as a cellular phone system or an ONSTAR™ telecommunication system such as is disclosed in U.S. patent application Ser. No.: 09/275,565, filed Mar. 24, 1999, titled "Safety Handle For Trunk of Vehicle" by Bingle et al. of Donnelly Corporation and in U.S. patent application Ser. No.: 09/449,121, filed Nov. 24, 1999, titled "Rearview Mirror Assembly With Utility Functions" by Hutzel et al. of Donnelly Corporation, the entire disclosures of both are hereby incorporated by reference herein. Acting in response to this output, a call can automatically be place via the in-vehicle telecommunication system to the emergency services or the like alerting that a person or pet is trapped in a vehicle compartment such as a trunk. Since such cellular phone type transmissions will be traceable as to the geographic origin of the call the location of the vehicle where the compartment occupancy entrapment event is occurring can be traced, and help can be dispatched. If the vehicle is already equipped with a global positioning system (GPS), then upon receipt of the output alerting of a trunk entrapment, the GPS data specifying the present geographic location of the subject vehicle can be transmitted by the vehicle telecommunication system to the alert rescue authorities as to the location of the vehicle and to summon help.

It should be noted that the present invention has been described above in detail by way of examples and illustrations for purposes of clarity of understanding, and not to in any way limit the scope of what is claimed. Those skilled in the art will understand that certain changes and modifications may be made to the spirit of the above without departing from the spirit of the invention.

What is claimed:

1. An apparatus for controlling the status of a compartment of a vehicle comprising:
a first sensor, disposed in the compartment, for generating a signal indicative of at least one of a person and an animal in the compartment, said first sensor responsive to sensing of at least one of motion and temperature;
a controller, coupled to the sensor, for receiving said signal and generating a control signal in accordance with said signal; and
a mechanism, adapted to have both open and closed positions, coupled to the controller, disposed in the compartment for receiving the control signal from the controller and entering an open position from a closed position when actuated by the control signal.

2. The apparatus as claimed in claim 1 wherein the controller receives a motion signal, generated by the vehicle, indicative of vehicle motion.

3. The apparatus as claimed in claim 2 wherein the vehicle generates the motion signal in accordance with an output of a vehicle motion sensor and the control signal will not actuate the mechanism while the motion signal indicates that the vehicle is in a non-stationary state.

4. The apparatus as claimed in claim 2 further comprising:
an output indicator, coupled to the controller, for receiving the control signal and outputting an indication in accordance with said signal.

5. The apparatus as claimed in claim 4 wherein the output indicator is selected from the group consisting of at least one of a horn, siren and pager.

6. The apparatus as claimed in claim 2 wherein said signal is generated by the first sensor sensing a predetermined quantity of stimuli within a predetermined period of time.

7. The apparatus as claimed in claim 4 further comprising:
a sensor indicator, mounted on the first sensor, for providing an indication signal indicative of the location of the first sensor.

8. The apparatus as claimed in claim 2 further comprising:
a seat, having front and rear surfaces, positioned so that the rear surface of the seat forms a surface of the compartment;
a seat position sensor, mounted on the seat and coupled to the controller, for generating a seat position signal indicative of vehicle seat position;
wherein the seat position sensor transmits the seat position signal to the controller, which uses the seat position signal as a component of the control signal.

9. The apparatus as claimed in claim 3 wherein the first sensor comprises a pyroelectric sensor.

10. The apparatus as claimed in claim 9 wherein the pyroelectric sensor requires less than 600 microamps of power during operation.

11. The apparatus as claimed in claim 6 further comprising:
a temperature sensor, coupled to the controller, for sensing compartment ambient temperature;
wherein the control generates the control signal based on a lower quantity of stimuli when the compartment ambient temperature exceeds a predetermined temperature.

12. The apparatus as claimed in claim 3 wherein the first sensor further comprises:
an photoelectric sensor for sensing ambient light energy and generating a light signal indicative of the sensed light;
wherein the first sensor utilizes the light signal as a component of the alert signal.

13. The apparatus as claimed in claim 1 wherein the compartment is a trunk of an automobile.

14. The apparatus as claimed in claim 1, wherein the first sensor further comprises:
a lens having one or more lenslets, each lenslet having a focal length between 5 mm and 10 mm.

15. The apparatus as claimed in claim 1, further comprising a handle having an attachment for interconnection with said mechanism and operable to cooperate with said mechanism to cause the mechanism to enter the open position upon activation of said handle.

16. The apparatus as claimed in claim 15, further comprising an illumination source operable to illuminate said handle, wherein upon the controller receiving said signal, said illumination source is activated to illuminate said handle.

17. The apparatus as claimed in claim 16, wherein said handle is a light color and is positioned on a dark background to provide a contrast in which said hanlde is highly visible when said illumination source is activated.

18. The apparatus as claimed in claim 17, wherein said illumination source comprises at least one light emitting diode.

19. The apparatus as claimed in claim 16, wherein said handle at least partially provides a mechanical advantage which requires less than or equal to about 20 Newtons applied thereto in order to cause the mechanism to enter the open position.

20. The apparatus as claimed in claim 15, wherein said handle comprises a phosphorescent material, such that said material of said handle provides illumination of said handle.

21. The apparatus as claimed in claim 16, wherein said illumination source is within said handle and provides illumination of said handle from therewithin.

22. The apparatus as claimed in claim 1 wherein said first sensor comprises a motion sensor.

23. The apparatus as claimed in claim 22 wherein said motion sensor comprises a pyrodetector.

24. The apparatus as claimed in claim 1 wherein said first sensor comprises a temperature sensor.

25. The apparatus as claimed in claim 24 wherein said temperature sensor comprises a bolometer.

26. The apparatus as claimed in claim 23 wherein said compartment comprises a trunk compartment.

27. The apparatus as claimed in claim 1, wherein said first sensor further comprises a filter to block radiation in wavelengths outside of a predetermined range, the predetermined range being chosen in accordance with radiation emission characteristics of a human or animal body.

28. The apparatus as claimed in claim 1, further comprising a level sensor, coupled to the controller, for detecting a towing condition, wherein when said level sensor detects the towing condition, said controller is disabled.

29. The apparatus as claimed in claim 1, wherein the sensor comprises a lens coupled to the sensor, the lens forming an air pocket between the lens and the sensor to insulate the sensor from fluctuations in temperature.

30. An apparatus for controlling a light source in a compartment comprising:
a latch, mounted on the compartment, for generating a latch signal indicative of latch position;
a pyroelectric sensor, mounted on a surface of the compartment, said pyroelectric sensor responsive to sensing a temperature of an object in the compartment and generating a signal indicative of a movement of at least one of a person and an animal in the compartment;

a light source, mounted on a surface of the compartment, for emitting light energy when actuated; and a controller, coupled to the latch, the sensor and the light source, for receiving said signal from the sensor and the latch signal from the latch, wherein the controller generates a control signal as a function of said signal and the latch signal, and the control signal actuates the light source.

31. A method for controlling the status of a compartment latch of a vehicle comprising:

sensing at least one of motion and temperature;

generating a signal indicative of a movement of at least one of a person and an animal in the compartment;

transmitting said signal to a controller;

generating a control signal in accordance with said signal; and actuating a latch in response to the control signal.

32. An apparatus for controlling the status of a compartment latch of a vehicle comprising:

means for sensing responsive to sensing of at least one of motion and temperature;

means for generating a signal indicative of a movement of at least one of a person and an animal in the compartment; and means for controlling the status of the compartment latch in accordance with said signal.

33. A vehicle cargo compartment control system for controlling an actuatable latch disposed on a cargo compartment of a vehicle, comprising:

a sensor, disposed in the cargo compartment, capable of sensing responsive to sensing of at least one of motion and temperature and generating a sensor signal indicative of a movement of at least one of a person and an animal in the cargo compartment; and a controller, coupled to the sensor and the actuatable latch of the cargo compartment, capable of receiving the sensor signal, wherein the controller determines whether the sensor signal exceeds a predetermined threshold, and actuates the latch of the cargo compartment when the sensor signal exceeds the predetermined threshold.

34. The vehicle cargo compartment control system as claimed in claim 33, wherein the determination of whether the sensor signal exceeds the predetermined threshold is a function of a quantity of sensor signals exceeding a predetermined magnitude received by the controller in a particular time interval.

35. A latch release system for actuating a trunk latch of a vehicle and the vehicle having a passenger compartment and a trunk compartment, the latch release system comprising:

a sensor, mounted in the interior of the trunk compartment, said sensor responsive to sensing of at least one of motion and temperature and generating an output signal indicative of at least one of a person and an animal in the trunk compartment;

an indicator, mounted in the passenger compartment of the vehicle, adapted to illuminate; and a controller, mounted on the vehicle and coupled to the sensor and the indicator, that receives the output signal from the sensor, and compares the magnitude and quantity of the output signals received from the sensor to a predetermined magnitude and a predetermined time period to establish an alarm condition, wherein the controller actuates the latch when an alarm condition has been established, and wherein the controller illuminates the indicator when an alarm condition has been established.

36. A system for sensing an occupant in a vehicle compartment comprising:

a primary sensor, mounted in the compartment, for sensing responsive to sensing at least one of motion and temperature, the primary sensor adapted to generate an output signal indicative of at least one of a person or animal in the compartment; and a controller, coupled to the primary sensor, for receiving the output signal from the primary sensor and generating a control signal based on the output signal, wherein the control signal is transmitted to one or more destinations, the destinations depending on the status of the vehicle.

37. The system as claimed in claim 36 wherein the destinations are selected from the group consisting of a latch release mechanism and an indicator.

38. A system for sensing an occupant in a vehicle compartment comprising:

a primary sensor, mounted in the compartment, for sensing responsive to sensing at least one of motion and temperature, the primary sensor adapted to generate a primary output signal indicative of at least one of a person or animal in the compartment;

one or more secondary sensors coupled to the primary sensor for generating a secondary output signal in response to receiving the primary output signal; and a controller, coupled to the secondary sensor, for receiving the secondary output signal from the secondary sensor and generating a control signal based on the secondary output signal, wherein the control signal is transmitted to one or more destinations, the destinations depending on a state of the vehicle.

39. A compartment sensing system for sensing an occupant in a trunk compartment of an automobile comprising:

a sensor, disposed in the trunk compartment, for sensing responsive to sensing at least one of motion and temperature and generating a sensor signal indicative of at least one of a person or animal in the compartment;

a controller, coupled to the sensor, for receiving the sensor signal and generating a control signal in response to the sensor signal; and an actuatable handle, for releasing a trunk lid, having an illumination device mounted within the handle, the illumination device coupled to the controller and upon receiving the control signal, illuminates.

* * * * *

UNITED STATES PATENT AND TRADEMARK OFFICE
CERTIFICATE OF CORRECTION

PATENT NO. : 6,480,103 B1
DATED : November 12, 2002
INVENTOR(S) : Kevin C. McCarthy et al.

It is certified that error appears in the above-identified patent and that said Letters Patent is hereby corrected as shown below:

<u>Title page,</u>
Item [63], Related U.S. Application Data, "6,086,131." should read
-- 6,086,131, and claims benefit of U.S. Provisional Application No. 60/135,393, filed May 21, 1999, now abandoned. --

<u>Column 1,</u>
Line 5, "6,086,131." should read -- 6,086,131, and claims benefit of U.S. Provisional Application No. 60/135,393, filed May 21, 1999, now abandoned. --

Signed and Sealed this

Twenty-fifth Day of March, 2003

JAMES E. ROGAN
*Director of the United States Patent and Trademark Office*